United States Patent
Shi et al.

(10) Patent No.: US 7,027,589 B2
(45) Date of Patent: Apr. 11, 2006

(54) SINGLE-ENDED LOOP TEST CIRCUITRY IN A CENTRAL OFFICE DSL MODEM

(75) Inventors: Hao Shi, Cupertino, CA (US); Peter J. Melsa, Niles, MI (US)

(73) Assignee: Texas Instruments Incorporated, Dallas, TX (US)

( * ) Notice: Subject to any disclaimer, the term of this patent is extended or adjusted under 35 U.S.C. 154(b) by 266 days.

(21) Appl. No.: 10/306,027

(22) Filed: Nov. 27, 2002

(65) Prior Publication Data

US 2004/0101130 A1 May 27, 2004

(51) Int. Cl.
*H04M 1/00* (2006.01)
*H04M 9/00* (2006.01)

(52) U.S. Cl. ............................ 379/399.01; 379/399.02; 379/402; 379/345; 379/26.01; 379/26.02; 379/27.01; 379/27.06; 379/29.01

(58) Field of Classification Search ............ 379/21–31, 379/399.01–413.04
See application file for complete search history.

(56) References Cited

U.S. PATENT DOCUMENTS

| | | | |
|---|---|---|---|
| 6,788,745 B1 * | 9/2004 | Lim et al. .................. | 375/297 |
| 2002/0097863 A1 * | 7/2002 | Rahamim et al. | |
| 2002/0172329 A1 * | 11/2002 | Rashid-Farrokhi et al. | |
| 2003/0147506 A1 * | 8/2003 | Kamali et al. | |

FOREIGN PATENT DOCUMENTS

EP    1 248 429 A    10/2002

OTHER PUBLICATIONS

Bostoen, et al., "Estimation of the Transfer Function of a Subscriber Loop by Means of a One-Port Scattering Parameter Measurement at the Central Office", *J. Selected Areas in Communications*, vol. 20, No. 5 (IEEE, Jun. 2002), pp. 936-948.

(Continued)

*Primary Examiner*—Sinh Tran
*Assistant Examiner*—Ramnandan Singh
(74) *Attorney, Agent, or Firm*—Abdul Zindani; W. James Brady, III; Frederick J. Telecky, Jr.

(57) ABSTRACT

A central office modem (50) that includes the capability of single-ended loop testing (SELT) is disclosed. The modem (50) includes a digital signal processor (54), a codec (56), line driver and receiver circuitry (58), and a hybrid circuit (60), by way of which a subscriber loop (LOOP) can be driven and sensed. The line driver and receiver circuitry (58) may include a transformer (74a, 74b) for driving the loop (LOOP), or the output may be capacitively coupled. The line driver and receiver circuitry (58) includes active termination, by way of operational amplifiers (80a, 80b). Switches (82a, 82b; 84a, 84b) are provided to selectively enable and disable the active termination function, and to selectively bypass or include the hybrid circuit (60). This control of the line driver and receiver circuitry (58) provides the ability to calibrate out its own characteristics, providing high precision SELT measurements of the load impedance type, and of frequency domain reflectometry, and time domain reflectometry. A third set of switches (86a, 86b) selectively bypass receive path filter circuitry (78), to permit upstream and downstream noise measurements.

29 Claims, 11 Drawing Sheets

OTHER PUBLICATIONS

Galli, et al., "Loop Makeup Identification Via Single Ended Testing: Beyond Mere Loop Qualification", *J. Selected Areas in Communications*, vol. 20, No. 5 (IEEE, Jun. 2002), pp. 923-935.

* cited by examiner

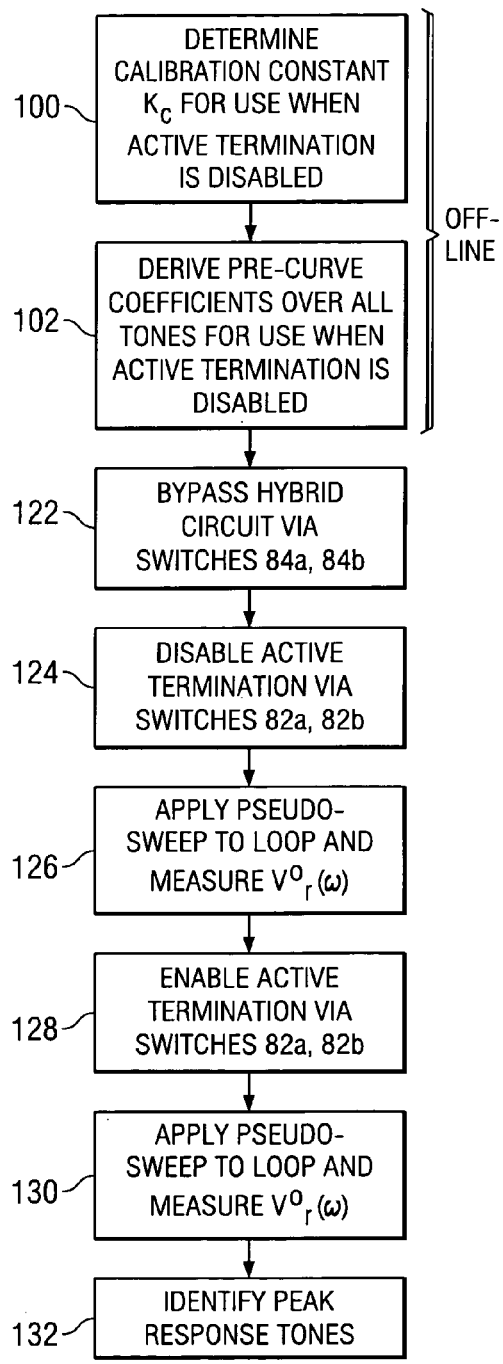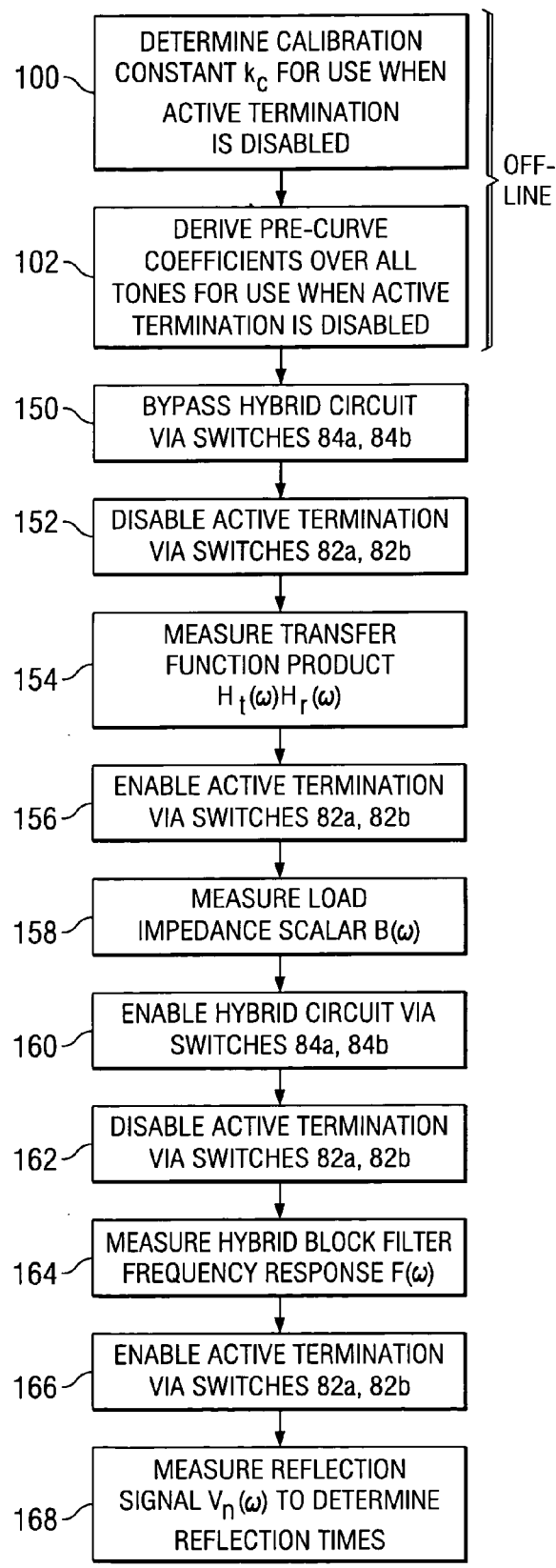

SINGLE-ENDED LOOP TEST CIRCUITRY IN A CENTRAL OFFICE DSL MODEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of data communications, and is more specifically directed to measurement of subscriber loop parameters from a central office location for Digital Subscriber Line (DSL) communications.

High-speed Internet access is now a widespread utility for many businesses, schools, and homes. As is fundamental in this art and as well known by most consumers, broadband communications according to Digital Subscriber Line (DSL) is a popular technology for providing high-speed communications over existing telephone lines, without disturbing conventional voice telephony (Plain Old Telephone Service, or "POTS").

FIG. 1a illustrates a conventional subscriber loop carrying out DSL communications between server SVR at a central office (CO) and a subscriber workstation CWS at the client premises. In this example, these bidirectional communications are carried out over loop LOOP, which is implemented by conventional twisted pair wire. At the central office, CO DSL modem 10c is bidirectionally coupled by a bus on one side to network or Internet server SVR, and on another side by a connection to subscriber loop LOOP. Conversely, at the client premises, subscriber DSL modem 10s is bidirectionally coupled via a bus to client workstation CWS and bidirectionally coupled to subscriber loop LOOP. Each of DSL modems 10c, 10s include parallel-in-serial-out transmit function 12c, 12s, which performs the appropriate modulation of the data to be transmitted, and applies the modulated signal to front end/hybrid 15c, 15s, which is also in DSL modem 10c, 10s, respectively. DSL modems 10c, 10s also include serial-in-parallel-out receive function 14c, 14s, which demodulate received signals and produce the appropriate parallel data stream to the respective host SVR, CWS, at the central office and client premises, respectively. According to the popular asymmetric DSL (ADSL) technology, a frequency division multiplexing (FDM) scheme places the upstream and downstream communications in separate, non-overlapping, frequency bands.

Fundamentally, conventional ADSL communications is carried out by way of Discrete Multitone (DMT) modulation, which is a form of broadband communications. According to conventional DMT technology, the available spectrum is subdivided into many subchannels (e.g., 256 subchannels of 4.3125 kHz). Each subchannel is centered about a carrier frequency that is phase and amplitude modulated, typically by Quadrature Amplitude Modulation (QAM), in which each symbol value is represented by a point in the complex plane. As known in the art, other modulation techniques are used for other types of DSL communications.

The number of available symbol values for each subchannel, and thus the number of bits in each symbol communicated over that subchannel (i.e., the "bit loading"), is determined during initialization of the DMT communications session. The bit loading on each DMT subchannel depends upon the signal-to-noise ratio (SNR) of the loop at the subchannel frequency. For example, relatively noise-free and low attenuation subchannels may communicate data in ten-bit to fifteen-bit symbols, represented by a relatively dense QAM constellation with short distances between points in the constellation. On the other hand, noisy channels may be limited to only two or three bits per symbol, allowing a greater distance between adjacent points in the QAM constellation. Typically, the SNR of some subchannels is so poor that these subchannels are unloaded, carrying no bits. DMT modulation thus maximizes the data rate over each subchannel, permitting high speed access to be carried out even over relatively noisy and attenuated twisted-pair lines.

This bit loading process requires measurement of the transmission characteristics between the central office (CO) of the DSL service provider and the client premises, over the range of subchannel frequencies. The signal-to-noise ratio at each of the subchannel frequencies are conventionally determined at the start of each communications session, from which the bit loading is determined. Under conventional DSL standards, the bit loading is determined during the "training" sequence at the beginning of the session, and relies upon bidirectional communications between the DSL transceiver at the CO and the DSL transceiver at the customer premises.

In addition, knowledge of the transmission channel characteristics is also important in initially setting up DSL service at a customer premises. Under current technology and DSL infrastructure deployment, not all home and office locations are within the DSL signal range of a CO. It is therefore desirable to determine whether reasonable data rates to the premises of a potential customer can be achieved under nominal conditions. Because there is necessarily no DSL transceiver located at the customer premises prior to installation, the bidirectional communications techniques used in DSL "training" are not available. As such, measurement of the transmission characteristics between a CO and a possible customer premises must either be performed in a "single-ended" manner by measuring the characteristics from the CO end of the connection, or by deploying a service technician to the customer premises to participate in bidirectional communications with the CO. Of course, single-ended loop characterization from the CO is preferred, because it avoids a "truck roll", to send a technician to the customer premises.

FIG. 1b illustrates the DSL subscriber loop for purposes of single-ended testing. In this approach, server SVR is bidirectionally coupled to DSL modem 10c at the central office, as before. Front-end/hybrid 15c drives signals on and receives signals from subscriber loop LOOP. However, as shown in FIG. 1b, there is no DSL modem at the end of loop LOOP at the customer premises. Rather, the termination of loop LOOP is considered simply as a load L, which is of course involved in the characterization of the transmission characteristics of loop LOOP. According to conventional single-ended loop test (SELT) methods, central office DSL modem 10c applies signals to loop LOOP, and characterizes the transmission parameters of loop LOOP based on the response of loop LOOP to these applied signals.

In modern DSL technology, three common SELT methods for measuring transmission line or loop characteristics are: load impedance measurements, frequency domain reflectometry (FDM), and time domain reflectometry (TDR). These conventional methods will now be described in connection with an example of conventional DSL modem line driver and receiver circuitry 18, which in combination with hybrid circuit 26 constitutes front-end hybrid circuit 15c, as illustrated in FIG. 2.

As shown in FIG. 2, conventional line driver and receiver circuitry 18c includes separate circuitry for the transmit and receive functions. On the transmit side, transmit path circuitry 20 receives signals from parallel-in-serial-out transmit function 12c, and it filters and otherwise processes these signals into the appropriate form for amplification and application to loop LOOP. The double-ended outputs of transmit path circuitry 20 are applied to amplifiers 22a, 22b, which amplify the modulated signal and apply the amplified signal to secondary windings of transformers 24a, 24b; the primary windings of transformers 24a, 24b are connected in series between the two conductors of transmission loop LOOP, according to the convention in the art. Transformers 24a, 24b may be implemented as a single physical transformer with split windings, as known in the art. Amplifiers 22a, 22b are conventional operational amplifiers, biased to amplify the output of transmit path 20 as appropriate. The passive components incorporated into line driver and receiver circuitry 18 for effecting such bias and amplifier control are present, in the conventional manner, and are not described here in detail. It is contemplated that those skilled in the art having reference to this specification will be readily able to design the amplifier circuitry and implement the appropriate biasing schemes, given the illustration of FIG. 2.

On the receive side, hybrid circuit 26 is coupled to the common side of the secondary windings of transformers 24a, 24b, and passes its received signals to receive path circuitry 28. Hybrid circuit 26 is a conventional isolation amplifier function, as used in conventional DSL modems, for isolating the receive path circuitry 28 from signals being transmitted by the transmit side of line driver and receiver circuitry 18, in the conventional manner. Receive path circuitry 28 filters and otherwise processes the received signals, and forwards these signals on to serial-in-parallel-out transmit function 14c.

Active termination is included in conventional line driver and receiver circuitry 18, by way of amplifiers 30a, 30b. As is well known in the transmission line art, reflections in the signals applied to a transmission line can be avoided by matching the output impedance of the driver to the transmission line impedance. In the simple case, passive termination schemes simply inserts a matching impedance into the front-end circuitry. However, one-half the transmitted power of the signal is dissipated by such passive termination.

It is known to use active termination circuitry, which matches the loop impedance while dissipating much less power. In conventional front-end/hybrid circuit 15c, active termination is implemented by way of operational amplifiers 30a, 30b, which have inputs coupled to the secondary winding of transformers 24a, 24b, respectively. The outputs of amplifiers 30a, 30b are coupled to the feedback inputs of line drive amplifiers 12a, 12b. According to this conventional operation, a simulation factor of on the order of $\frac{1}{11}$ can be achieved, meaning that impedance mismatching reflections are substantially eliminated, while only dissipating on the order of 10% of the power of the line driver circuitry.

In the arrangement of FIGS. 1b and 2, for purposes of SELT, several assumptions can be made. First, the output impedance of the line driver without considering the active termination circuit can be assumed to be zero. Second, the input impedance of hybrid circuit 26 can be assumed to be infinite. Third, a noise voltage $V_n$ can be assumed to be zero mean stationary and ergodic.

For the impedance measurement method of SELT characterization of loop LOOP, with load L at the distal end of loop LOOP from modem 10c, the output voltage $V_r$ at the output of receive path circuitry 28 can be considered, in the frequency domain, as a function of the transmit voltage $V_t$ at the input to transmit path circuitry 20, as follows:

$$V_r(\omega)=f_1((Z_L(\omega))H_t(\omega)H_r(\omega)H_{ht}(\omega)V_t(\omega)+f_2((Z_L(\omega)) H_r(\omega)H_{hn}(\omega)V_n(\omega) \quad (1)$$

In this equation (1), the functions $f_1(Z_L(\omega))$ and $f_2(Z_L(\omega))$ are the ideal line driver transfer functions. Transfer function $H_t(\omega)$ is the transfer function of transmit path circuitry 20, transfer function $H_r(\omega)$ is the transfer function of receive path circuitry 28, and transfer functions $H_{ht}(\omega)$, $H_{hn}(\omega)$, are the transfer functions of hybrid circuit 26 responsive to echoed transmit voltage $V_t$ and noise $V_n$, respectively.

Under the assumptions that noise $V_n(\omega)$ is zero mean stationary and ergodic, and that transmit voltage signal $V_t(\omega)$ is periodic, the noise term of the response equation for $V_r(\omega)$ can be removed by time-averaging the time-domain received voltage $v_r(i)$:

$$\overline{v}_r(i) = \frac{1}{N}\sum_{j=0}^{N-1} v_r(i+Mj), \quad \text{for } i=0, 1, \ldots, M-1 \quad (2)$$

where M is the period of $v_t$, so that $\overline{v}_r$ depends only upon $v_t$. This permits expression of the average received voltage signal, in the frequency domain, by:

$$\overline{V}_r(\omega)=f_1((Z_L(\omega))H_t(\omega)H_r(\omega)H_{ht}(\omega)V_t(\omega) \quad (3)$$

With knowledge of the transfer functions $H_t(\omega)$, $H_r(\omega)$, $H_{ht}(\omega)$, one can thus solve for the impedance $Z_L(\omega)$ of transmission loop LOOP. This impedance measurement is typically executed by a minimization algorithm, by way of which the values of a set of loop physical parameters are iterated to minimize a cost function matching this expression of $\overline{V}_r$. The cost function is typically the integral, over frequency, of the absolute value of the difference between a function of the set of loop physical parameters and the load impedance function $f_1((Z_L(\omega))$, where the load impedance is expressed in terms of a ratio of the received average voltage $\overline{V}_r(\omega)$ and the product $H_t(\omega)H_r(\omega)H_{ht}(\omega)V_t(\omega)$. Least mean squares minimization is the typical minimization approach, following which an alignment algorithm may be applied to solve for the phase information of this impedance $Z_L(\omega)$.

While this impedance measurement SELT approach is accurate for short transmission loops, it has been observed that this method is not particularly useful for longer transmission loops. At long loop lengths, the load impedance $Z_L$ is dominated by the characteristic impedance $Z_0$ of loop LOOP, which is independent of the loop length and also independent of the termination type at the remote end (i.e., independently of load L of FIG. 1b.). It is therefore difficult to estimate the termination impedance from the determination of the overall loop impedance $Z_L$. In addition, active termination circuitry, such as that implemented in the conventional arrangement of FIG. 2, has a frequency response that depends on the loop impedance itself. This makes measurement of the loop impedance $Z_L$ difficult when active termination is involved.

The other conventional SELT approaches are reflection-based, in that they rely on the partial reflection of a transmitted signal from locations along transmission loop LOOP at which impedances are mismatched. In the general sense, a reflection coefficient ρ is defined at an impedance mismatch location as:

$$\rho = \frac{V_0^- e^{-\gamma D}}{V_0^+ e^{\gamma D}} = \frac{Z_1 - Z_0}{Z_1 + Z_0} \quad (4)$$

In this equation, the voltages $V_0^+$ and $V_0^-$ are the nominal voltage amplitudes of the forward-going and reflected signals from the reflection location, respectively. Impedance $Z_0$ is the characteristic impedance of the transmission line, while impedance $Z_1$ is the mismatched impedance. Propagation constant $\gamma = \alpha + \beta i$ characterizes the transmission, and loop length D is the distance to the mismatch location. Following this expression, the short loop case ($Z_1=0$) has a reflection coefficient ρ of −1, and the open loop case (with $Z_1$ infinite) has a reflection coefficient ρ of +1. In general, the voltage and current at any point of the loop is the superposition of the forward and backward traveling voltage and current waveforms:

$$V(x) = V_0^+ e^{-\gamma x} + V_0^- e^{\gamma x} \quad (5a)$$

$$I(x) = I_0^+ e^{-\gamma x} + I_0^- e^{\gamma x} \quad (5b)$$

where x is the position along the loop from the transmit end.

Two different reflectometry approaches for determining the characteristics of a DSL transmission loop are known. One approach, referred to as Frequency Domain Reflectometry (FDR), is based on the fundamental knowledge that, in the transmission loop context, a standing wave is formed at wavelengths for which the round trip distance between the signal source and the impedance mismatch location is a multiple; these wavelengths can easily be synchronously detected as voltage peaks in the spectrum. According to the FDR approach, the loop length D can be calculated from measurement of the characteristic resonant frequencies at which standing waves are present.

As is fundamental in this art, one can express the measured voltage V(x) at a point x along an unterminated lossless transmission fine as:

$$V(x) = 2V_0^+ e^{\beta D i} \cos[\beta(x+D)] \quad (6)$$

for loop length D. To maximize the voltage V(0) at the source end (which is where the measurements are also made in SELT), the product βD=nπ for n=0, 1, . . . , which, for traveling wave wavelength $$\lambda = \frac{2\pi}{\beta},$$

results in $$\frac{2D}{\lambda} = n,$$

for n=0,1, . . . For a short-circuited lossless transmission line, the transmission line voltage V(x) is:

$$V(x) = -2V_0^+ e^{-\beta D i} \sin[\beta(x+D)]i \quad (7)$$

The source end voltage V(0) is maximized when the product $$\beta D = \frac{(2n+1)\pi}{2}$$

for n=0, 1, . . . , which result in $$\frac{2D}{\lambda} = \frac{2n+1}{2},$$

for n=0, 1 . . . These conclusions also apply to lossy transmission lines, as can be derived by those skilled in the art. Accordingly, one can solve for loop length D from these real and imaginary components of voltage V(0), at two or more peak frequencies.

FIG. 3 illustrates a simplified conventional FDR measurement scheme for SELT of transmission loop LOOP with load L. Sinusoid generator 32 applies a sinusoid sweep signal into loop LOOP through resistor load 35. The sum of the applied sinusoid sweep, and its reflected voltage from loop LOOP and load L, at node N is applied to one input of each of multipliers 34, 36. Multiplier 34 also receives the sinusoid sweep from sinusoid generator 32, while multiplier 36 receives a phase-shifted sinusoid (cosine) sweep from sinusoid generator 33. The outputs of multipliers 34, 36 are applied to amplifiers 37, 39, respectively, to produce the imaginary and real components of the voltage V(0,ω) at node N, at the source of transmission loop LOOP. The frequency-domain voltage V(0,ω) at node N can be expressed as:

$$V(0, \omega) = \frac{V_t(\omega)}{H_r(\omega) H_{ht}(\omega) f_1((Z_L(\omega)))} \quad (8)$$

Once the product of $H_r(\omega) H_{ht}(\omega) f_1((Z_L(\omega)))$ is calibrated out, the peak frequencies of V(0,ω) and the wavelengths of the excitation signals from sinusoid generator 32 lead to the calculation of the loop length and reflection coefficient.

It has been observed, however, that the minimum loop length detectable by this conventional FDR approach is determined by the highest frequency of the input signal from sinusoid generator 32. In conventional DSL SELT, this highest tone is tone 63, from which the minimum detectable loop length is 1000 feet. Unfortunately, some loops may be shorter than this minimum length, and thus measurement of those loop lengths is not possible by FDR. In addition, because the loop length is determined by the ratio of two peak-frequencies, precision may be unacceptable if the peak frequencies are too close to one another.

By way of further background, a frequency domain reflectometry approach to characterizing a subscriber loop by estimations of a scattering parameter is described in Bostoen et al., "Estimation of the Transfer Function of a Subscriber Loop by Means of a One-Port Scattering Parameter Measurement at the Central Office", *IEEE J. Selected Areas in Communications*, Vol. 20, No. 5 (June 2002), pp. 936–948.

Another conventional approach to SELT is time-domain reflectometry (TDR). According to this approach, the time delay $T_p$ between an excitation signal and the reflected response depends upon the loop length D from the source to the location of the impedance mismatch:

$$D = \frac{V_{op}(f)T_p}{2} \quad (9)$$

using the frequency-dependent velocity of propagation $V_{op}(f)$ along transmission loop LOOP. Unfortunately, loop attenuation is often so large that the reflection signal is too weak to be detected over long loops, because the amplitude of the reflection is dwarfed by the transient response of the forward going signal. In other words, the reflected signal depends on:

$$v_0^-(t) = v_0(t) - v_0^+(t) = v_0(0,t,Z_L) - v_0(0,t,Z_L^0) \quad (10)$$

where $v_0(0,t,Z_L)$ is the measured waveform, and where $v_0(0,t,Z_L^0)$ is the waveform if the loop LOOP is properly terminated at load L, with no reflection.

FIG. 4 illustrates a conventional TDR instrument architecture. Pseudo-random sequence function 40 generates a pseudo-random digital sequence to be transmitted. The use of a pseudo-random sequence for TDR measurement provides the advantages of controlled power-spectrum density (PSD) within the requirements of the operative DSL standard, and also the ease of correlation with the reflection signal. Following filtering by transmit filter 42, digital-to-analog converter (DAC) 44 converts the filtered pseudo-random sequence to an analog signal that is transmitted over transmission loop LOOP via line interface 46. Line interface 46 also senses the voltage V(0) at the source end of loop LOOP, and applies this voltage to analog-to-digital converter (ADC) 47. After filtering by receive filter 48, the filtered received digital signal is applied to sequence correlator 49. Sequence correlator 49 performs digital matching of the filtered received signal against the output of pseudo-random sequence function 40, to determine the delay times $T_p$ between points in the sequence of the output of pseudo-random sequence function 40 and the times at which these points in the sequence appear as reflected signals from loop LOOP. The delay times $T_p$ are then processed to derive the loop parameters, as mentioned above.

By way of further background, a TDR methodology for loop qualification and characterization is described in Galli et al., "Loop Makeup Identification Via Single Ended Testing: Beyond Mere Loop Qualification", *IEEE J. Selected Areas in Communications*, Vol. 20, No. 5 (June, 2002), pp. 923–935.

It has been observed, however, that conventional TDR is difficult to implement. Primarily, the weakness of the reflected signal often makes the correlation by sequence correlator 49 very difficult and imprecise. Short loop cases also require significant calibration to remove the transient response, especially with active termination involved in the transceiver and at short loop lengths.

BRIEF SUMMARY OF THE INVENTION

It is therefore an object of this invention to provide a modem transceiver that includes the capability for accurately measuring loop parameters in single-ended loop testing (SELT).

It is a further object of this invention to provide such a transceiver for which calibration requirements are minimized.

It is a further object of this invention to provide such a transceiver that includes active termination.

It is a further object of this invention to provide such a transceiver that is well suited for loop measurement and reflectometry SELT techniques.

It is a further object of this invention to provide such a transceiver architecture that is suitable for use in transformer-based and transformer-less transceivers.

Other objects and advantages of this invention will be apparent to those of ordinary skill in the art having reference to the following specification together with its drawings.

The present invention may be implemented in a DSL modem transceiver, including a transmit path, a receive path, hybrid circuitry, and active termination circuitry. A first pair of switches bypasses the hybrid circuit for load impedance and frequency domain reflectometry measurements. The first pair of switches includes the hybrid circuit for time domain reflectometry measurement. A second pair of switches disables the active termination circuitry in a calibration phase, to ensure that the loop impedance measurement is made independently from the active termination circuitry. The invention may be implemented in transceivers that either include or do not include transformer output.

BRIEF DESCRIPTION OF THE SEVERAL VIEWS OF THE DRAWING

FIG. 10 is a flow diagram illustrating the operation of the front end circuitry of FIG. 6 in performing SELT frequency domain reflectometry (FDR) measurements according to the first preferred embodiment of the invention.

FIG. 11 is a flow diagram illustrating the operation of the front end circuitry of FIG. 6 in performing SELT time domain reflectometry (TDR) measurements according to the first preferred embodiment of the invention.

DETAILED DESCRIPTION OF THE INVENTION

The present invention will be described in connection with its preferred embodiments, in a central office (CO) Digital Subscriber Line (DSL) modem transceiver. This example of the implementation of this invention is considered to be especially appropriate for this description, as it is believed that the advantages of this invention are of great benefit to such an implementation. In this example, the DSL modem in this example carries out Discrete Multitone modulation of signals, based on the inverse FFT (IFFT) of data symbols, because of the popularity of this technology for ADSL communications. However, this invention is it is contemplated that this invention may also be used in other applications and implementations including, for example, according to other modulation techniques as used for other types of DSL and broadband communications, and the benefits of this invention attained at least in part in such other applications and implementations. Accordingly, the following description is presented by way of example only, and is not intended to limit the true scope of the invention as claimed.

Figure 5:
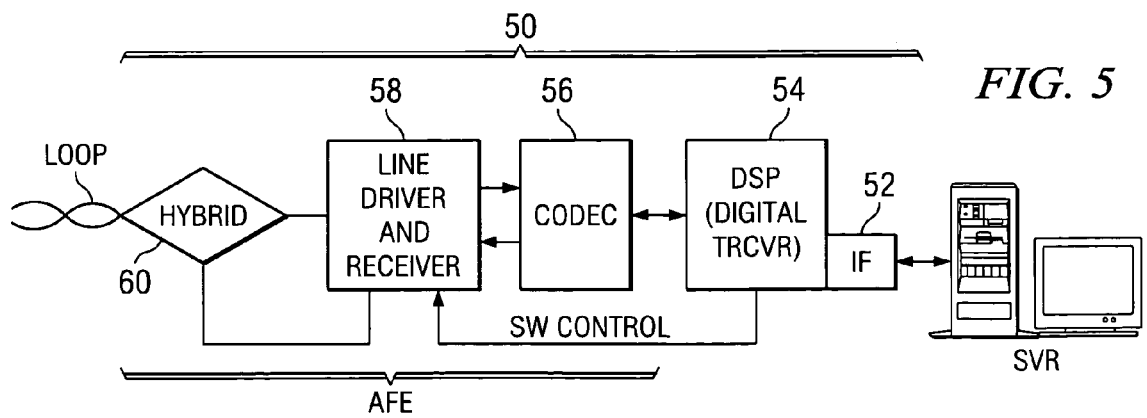
FIG. 5 is an electrical diagram, in block and schematic form, of a DSL modem transceiver according to the preferred embodiments of the invention.

FIG. 5 illustrates, in block form, central office (CO) DSL modem 50, constructed according to the preferred embodiments of the invention. DSL modem 50 is connected on one side to server SVR and on another side to transmission loop LOOP. Server SVR controls access to the ultimate network, which may be a wide-area network (WAN) or the Internet. In modem 50, interface function 52 receives and presents digital signals to server SVR, such signals generated by or forwarded to digital signal processor (DSP) 54, which serves as a digital transceiver for DSL communications. DSP 54 is a high performance digital signal processor, programmed to execute digital operations in response to program instructions. These digital operations include the encoding of digital data to be transmitted into the Discrete Multitone (DMT) subchannels, and conversely the decoding of received signals from the subchannels into digital data that is forwarded to server SVR. Exemplary devices suitable for use as DSP 54 include DSPs having computational power similar to or greater than the TMS320c5x and TMS320c6x DSPs available from Texas Instruments Incorporated.

As shown in FIG. 5, this exemplary construction of CO modem 50 includes hybrid circuit 60; which is connected to the twisted-pair facility serving as transmission loop LOOP. Hybrid circuit 60 is a conventional circuit that converts the two-wire arrangement of the twisted-pair facility to dedicated transmit and receive lines connected to line driver and receiver 58. Line driver and receiver 58 is a high-speed line driver and receiver for driving and receiving DSL signals over twisted-pair lines, and its construction according to this embodiment of the invention will be described in detail below. An example of the capability of line driver and receiver 58 is the THS7102 line driver/receiver available from Texas Instruments Incorporated. Line driver and receiver 58 is bidirectionally coupled to coder/decoder (codec) circuit 56, which carries out analog filtering, analog-to-digital conversion, and some amount of digital filtering. In addition, codec circuit 56 includes serial-in-parallel-out functionality for received signals, and parallel-in-serial-out functionality for signals to be transmitted. According to the preferred embodiment of the invention, in which asymmetric DSL (ADSL) communications are carried out according to a frequency division multiplexing (FDM) scheme, the upstream and downstream communications are in separate, non-overlapping, frequency bands, in which case codec circuit 56 filters the incoming downstream signal to eliminate any interference from signals that it is transmitting. An example of a suitable codec device may be selected from the TLV320AD1x device family available from Texas Instruments Incorporated. Hybrid circuit 60, line driver and receiver 58, and codec 56 are often referred to, in the aggregate, as an "analog front end".

According to the preferred embodiment of the invention, control switches are implemented into line driver and receiver 58, for controlling the enabling, disabling, and switching out of various functions in that circuitry. As shown in FIG. 5, these control switches are controlled by DSP 54 issuing signals over lines SW CTRL, preferably under program control. Alternatively, other control circuitry in DSL modem 50 may control these control switches, either under program control or direct user control.

Transformer-Based Line Driver Circuitry

Figure 1A:
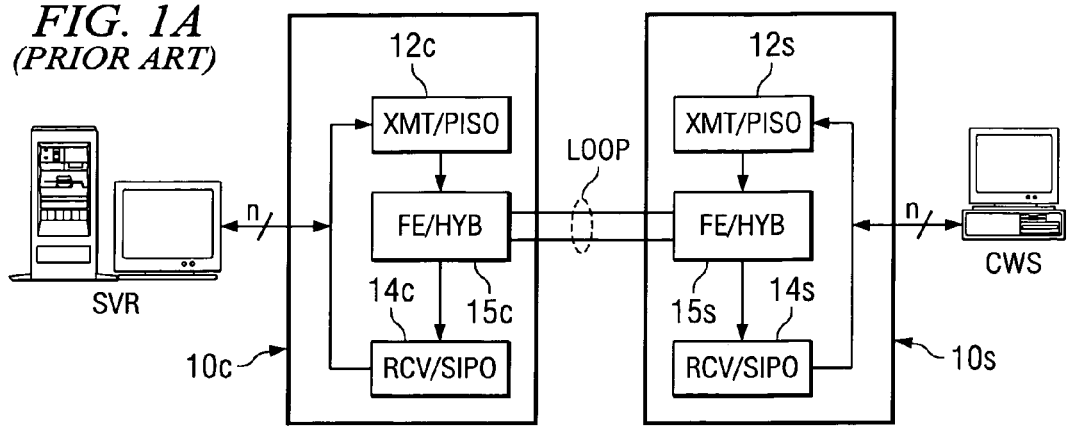
FIG. 1a is an electrical diagram, in block form, illustrating conventional Digital Subscriber Line (DSL) communications from a central office modem transceiver.
Figure 1B:
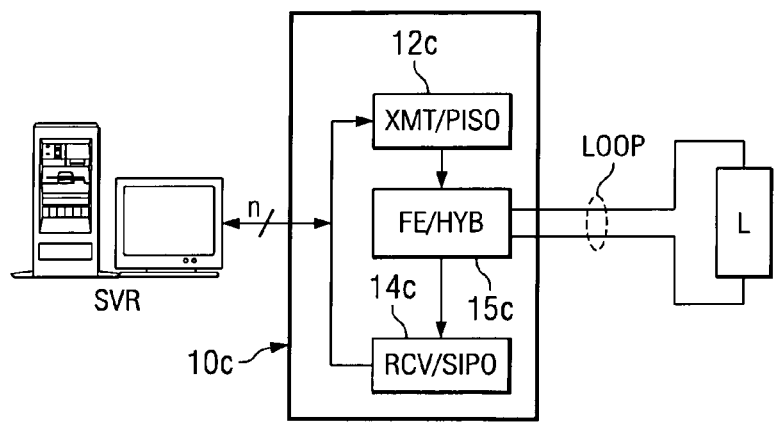
FIG. 1b is an electrical diagram, in block form, illustrating conventional single-ended loop testing (SELT) of a transmission loop.
Figure 2:
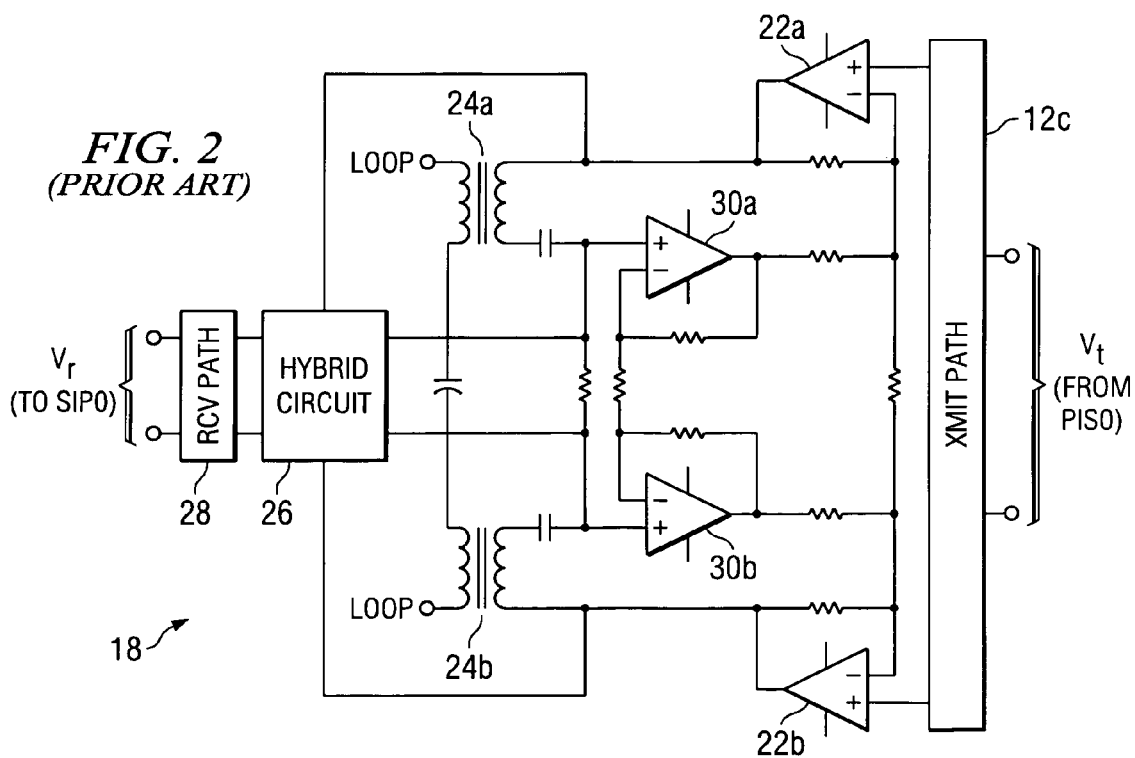
FIG. 2 is an electrical diagram, in block and schematic form, of conventional front-end circuitry in a DSL modem transceiver.
Figure 6:
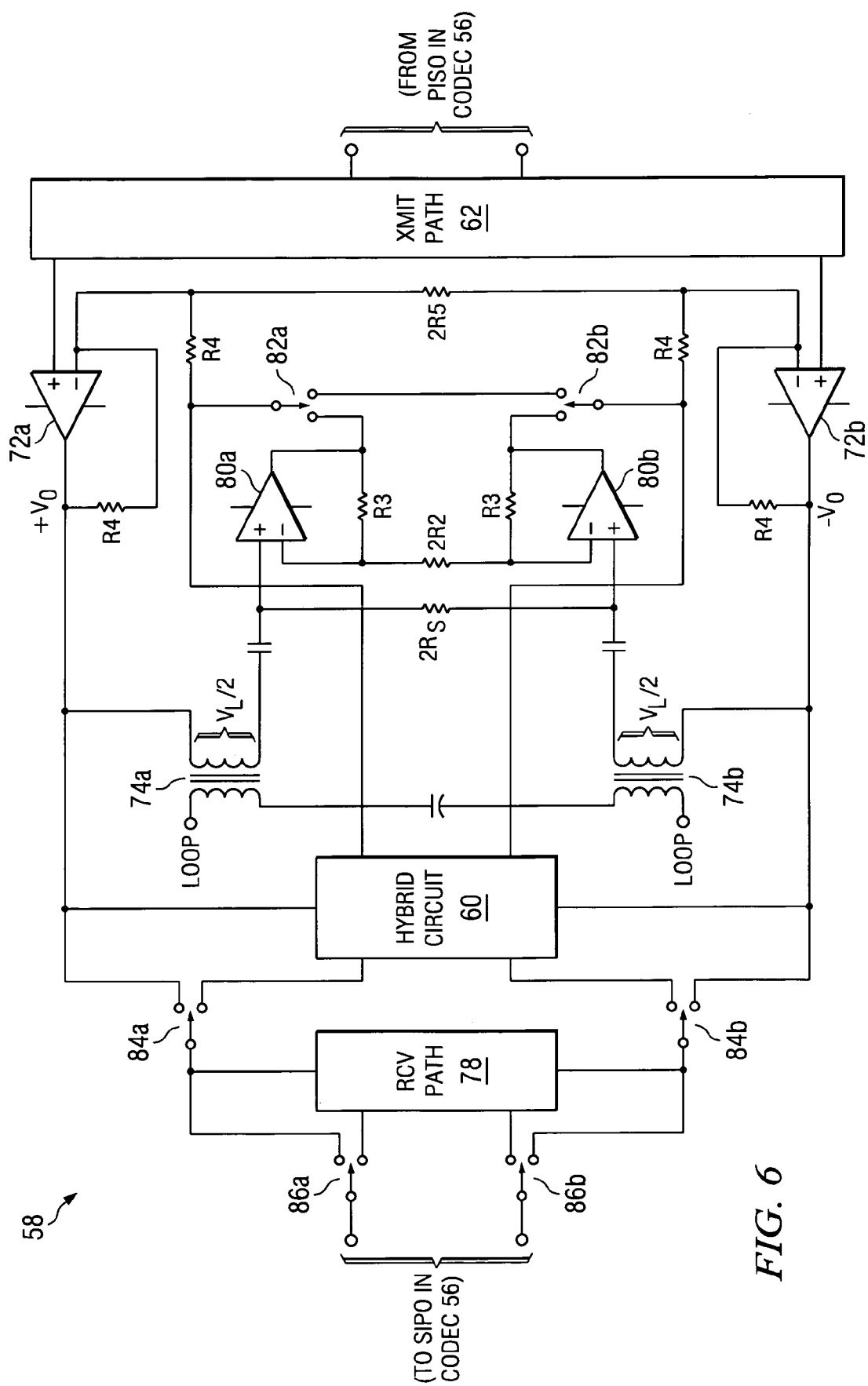
FIG. 6 is an electrical diagram, in block and schematic form, of front-end circuitry in the DSL modem transceiver of FIG. 5 according to a first preferred embodiment of the invention.

Referring now to FIG. 6, line driver and receiver 58 according to a first preferred embodiment of the invention will now be described in detail, in combination with hybrid circuit 60. Line driver and receiver 58 according to this embodiment of the invention is transformer-based, and as such includes transformers 74a, 74b that have their primary windings (in the transmit sense) connected in series between the two conductors of transmission loop LOOP. Line driver and receiver 58 is constructed somewhat similarly as line driver and receiver 18 of FIG. 2, and as such includes separate circuitry for the transmit and receive functions. On the transmit side, transmit path circuitry 62 receives signals from the parallel-in-serial-out function in codec 56, and filters and otherwise processes these signals into the appropriate form for amplification. Amplifiers 72a, 72b receive the outputs of transmit path circuitry 62 at their non-inverting inputs, amplify the modulated signal, and apply the amplified signal to secondary windings of transformers 74a, 74b. Transformers 74a, 74b may preferably be implemented as a single physical transformer with split windings, as known in the art, but for purposes of this description will be referred to in the plural, for consistency with the drawings. Feedback signals from the outputs of amplifiers 72a, 72b are applied to the inverting inputs of amplifiers 72a, 72b, through an instance of resistor R4. The inverting, feedback, inputs of amplifiers 72a, 72b are also connected to one another through resistor 2R5, in the conventional manner. Amplifiers 72a, 72b are conventional power amplifiers, biased to amplify the output signal as appropriate for the particular standard.

On the receive side of line driver and receiver circuitry 58, hybrid circuit 60 and receive path circuitry 78 couple the secondary windings of transformers 74a, 74b to serial-in-parallel-out function in codec 56. Hybrid circuit 26 is a conventional isolation amplifier function, as used in conventional DSL modems, for isolating the receive path circuitry 78 from the transmitted signals, in the conventional manner. In this regard, hybrid circuit 60 receives the state at the secondary windings of transformers 74a, 74b at inputs, and presents outputs to the feedback loops of amplifiers 72a, 72b, as well as potential inputs to receive path circuitry 78 (through switches 84a, 84b). Receive path circuitry 78 filters and otherwise processes the received signals from transformers 74a, 74b via hybrid circuit 60, and forwards these signals on to the serial-in-parallel-out transmit function of codec 56.

Active termination is provided in line driver and receiver circuitry 58, by the operation of amplifiers 80a, 80b. Amplifiers 80a, 80b each have their non-inverting input coupled to the secondary windings of transformers 74a, 74b, respectively, and their inverting feedback inputs coupled to hybrid circuit 60 and through a feedback resistor R3 to their respective outputs. The feedback inputs of amplifiers 80a, 80b are also connected to one another, via resistor 2R2. As discussed above, active termination implemented by amplifiers 80 provide the benefit of matching the impedance of loop LOOP, while reducing the power dissipation through such termination.

Figure 3:
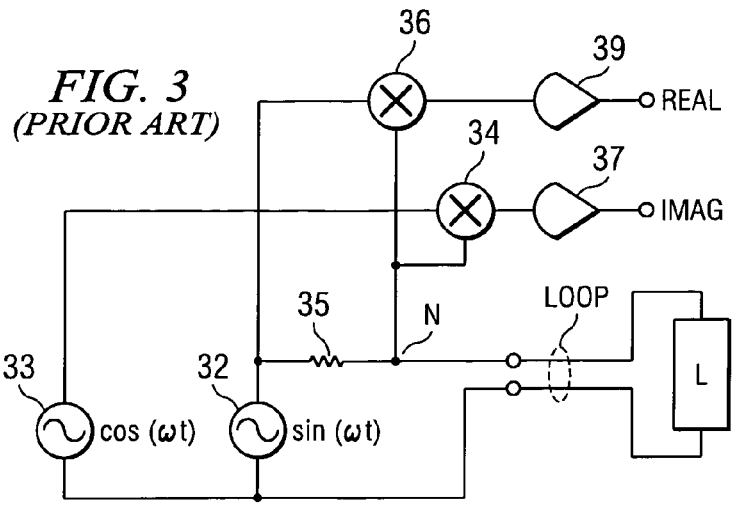
FIG. 3 is an electrical diagram, in schematic form, of conventional circuitry for frequency domain reflectometry (FDM) SELT of a transmission loop.
Figure 4:
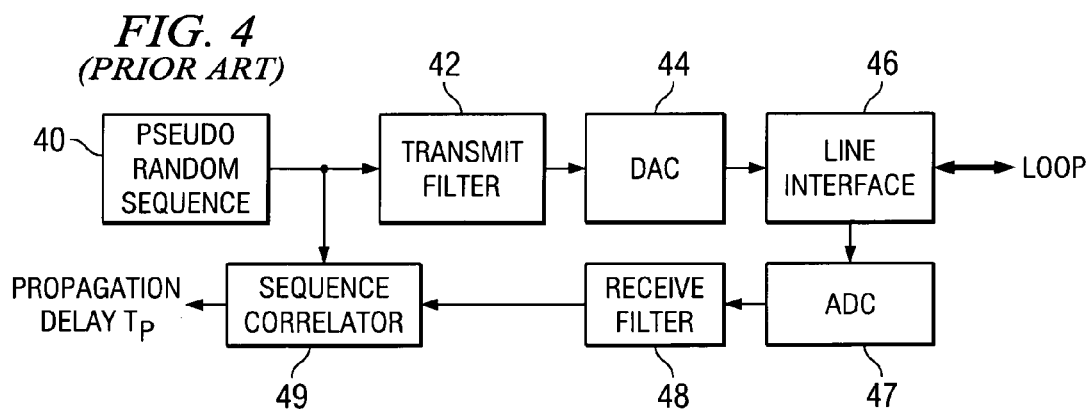
FIG. 4 is an electrical diagram, in block form, of conventional circuitry for time domain reflectometry (FDM) SELT of a transmission loop.

As in the prior case, and as shown in FIG. 3, passive components are incorporated into line driver and receiver circuitry 58 to provide the proper bias and amplifier control. It is contemplated that those skilled in the art, having reference to this specification, will be readily able to implement the appropriate biasing schemes. As shown in FIG. 6, certain resistors within line driver and receiver circuitry 58 have certain values relative to one another, and that affect the measurement of the various load impedance and loop characteristics as will be described below. Those resistors, such as resistors 2R2, R3, R4, 2R5, and $2R_s$, are illustrated in FIG. 6 in connection with these values, and as such certain ones of these resistors may be referred to by the same reference numerals.

According to this embodiment of the invention, various switches are incorporated within line driver and receiver circuitry 58 to control its operation during single-ended loop testing (SELT) operations. These switches are controlled by DSP 54 or other control circuitry, under user or program control as appropriate.

Switches 82a, 82b are connected to the outputs of respective active termination amplifiers 80a, 80b. Under the control of DSP 54, switches 82a, 82b selectively enable active termination by amplifiers 80a, 80b by coupling their outputs to the feedback inputs of amplifiers 72a, 72b, respectively, and selectively disable amplifiers 80a, 80b by not making that connection (connecting the outputs of amplifiers 80a, 80b together, in this example). As such, switches 82a, 82b serve to switch in and out the active termination provided by amplifiers 80a, 80b. This switching out of the active termination permits measurement in a manner that is independent of the loop impedance $Z_L(\omega)$.

Switches 84a, 84b are connected to the two inputs to receive path circuitry 78, while switches 86a, 86b are connected in series with the inputs of codec 56. Switches 84a, 84b connect the input of receive path circuitry either directly to the secondary windings of transformers 74a, 74b, respectively, or to the output of hybrid circuit 60. In effect, switches 84a, 84b thus operate to selectively bypass hybrid circuit 60. Switches 86a, 86b connect the inputs to codec 56 to either the output of receive path circuitry 78, or to switches 84a, 84b, respectively; in this manner, switches 86a, 86b operate to selectively bypass the receive path circuitry 78, specifically the receive path analog filtering performed by circuitry 78. Bypass of the receive path analog filter is especially beneficial in making noise level measurements.

Switches 84a, 84b, 86a, 86b are also controlled by DSP 54, or other control circuitry, under user or program control, as the case may be. In a normal operating mode, switches 84a, 84b connect the input of receive path circuitry 78 to the output of hybrid circuit 60 while switches 86a, 86b connect the outputs of receive path circuitry 78 to the inputs of codec 56, thus enabling hybrid circuit 60 and receive path circuitry 78 to process and forward the received signals. In a bypass mode, switches 86a, 86b connect the inputs of codec 56 to the secondary windings of transformers 74a, 74b, through switches 84a, 84b in the corresponding state, bypassing hybrid circuit 60 and receive path circuitry 78. This mode permits the measurement of downstream noise without the filtering applied by receive path circuitry 78. In a different bypass mode, hybrid circuit 60 is bypassed by switches 84a, 84b, permitting operation of the receive path circuitry 78.

Also according to the preferred embodiment of the invention, the inputs to hybrid circuit 60 are coupled to the outputs of active termination amplifiers 80a, 80b, as shown in FIG. 6. This connection is useful in making precision TDR measurements according to the preferred embodiments of the invention, and also improves the performance of hybrid circuit 60 in normal operation.

Switches 82, 84, 86, are preferably implemented by way of modern solid-state integrated circuits, a preferred example of which is the SN74LVC2G53 dual analog multiplexer/demultiplexer available from Texas Instruments Incorporated. Such multiplexer/demultiplexer devices provide high-speed single-pole double-throw switching, as suitable for this preferred embodiment of the invention.

The operation of line driver and receiver circuitry 58 according to the preferred embodiment of the invention will now be described. According to this embodiment of the invention, SELT techniques are used to measure load impedance of transmission loop LOOP, as well as carry out FDR and TDR measurements of its properties and parameters. These sets of measurements may be all carried out in sequence, or performed individually, depending upon the SELT measurements that are desired for a particular installation. Switches 82, 84, 86, under the control of DSP 54 according to this preferred embodiment of the invention control this SELT operation, as will now be described in detail.

Load Impedance Measurement

According to the preferred embodiment of the invention, the loop impedance measurement approach can be followed to measure the loop termination impedance $Z_L$ in an SELT manner, as well to estimate various physical loop parameters by way of a minimization approach. As known in the art, the intended purpose of hybrid circuit 60 in line driver and receiver circuit 58 of FIG. 6 is to block the transmitted signal $v_t$ while passing the received signal $v_r$. This contradicts the echo-based load impedance measurements. According to this embodiment of the invention, hybrid circuit 60 is bypassed during load impedance measurements, so that echo-based measurements can be made.

In addition, as mentioned above, knowledge of the exact internal impedances of line driver and receiver circuit 58 permit their elimination from the impedance measurements, as is necessary in order to measure the loop termination impedance $Z_L$. Even with modern high precision manufacturing techniques, however, the exact passive component values can at best be estimated. According to the preferred embodiment of the invention, these internal impedances are calibrated out, so that their contribution to the load impedance measurement is eliminated.

Figure 7:
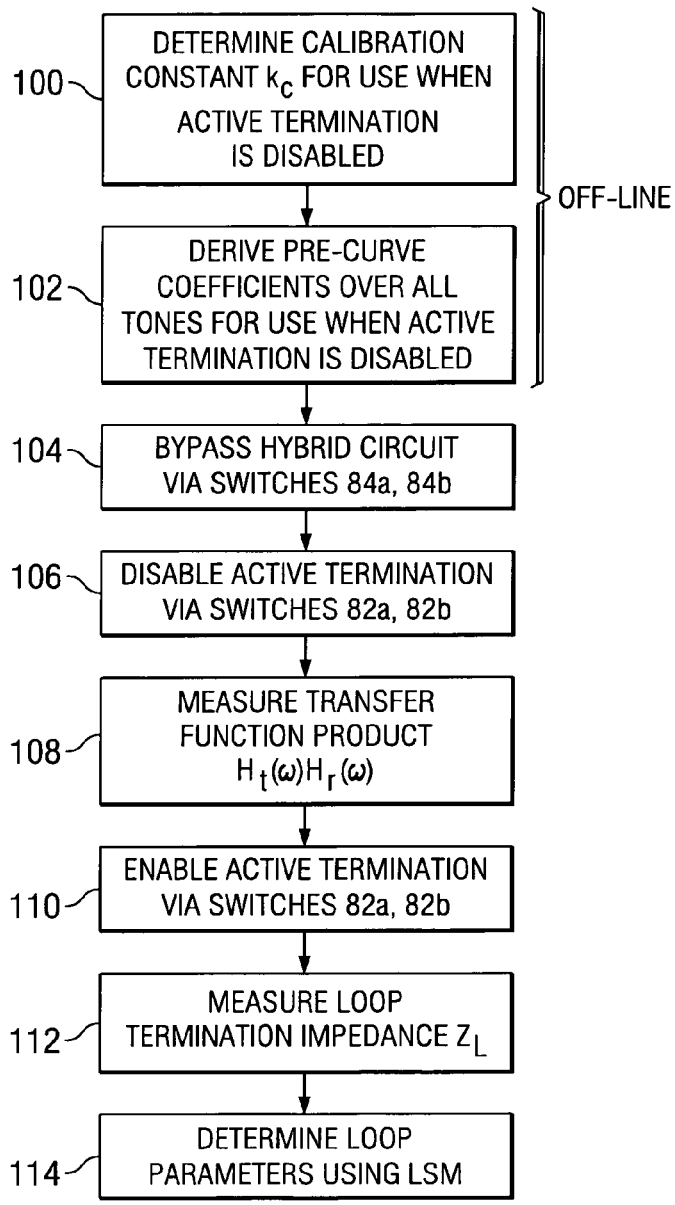
FIG. 7 is a flow diagram illustrating the operation of the front end circuitry of FIG. 6 in performing SELT load impedance measurements according to the first preferred embodiment of the invention.

Referring now to FIG. 7, a method of carrying out load impedance measurements according to a preferred embodiment of the invention will now be described. Line driver and receiver circuitry 58 is used to perform this measurement, because of its ability to selectively bypass certain circuit functions.

According to this preferred embodiment of the invention, the effects of the active termination provided by amplifiers 80a, 80b are to be calibrated out of the measurement. More specifically, while the active termination function eliminates load impedance mismatches, its presence both alters the gain of line driver and receiver circuitry 58, and also alters the shape of the power over frequency, specifically over the "tones" used in modern DSL communications. According to this preferred embodiment of the invention, the gain is calibrated by the deriving of a calibration constant $k_c$, and the spectral shape of the power output is calibrated by the pre-curving of the amplitudes over frequency.

Figure 8:
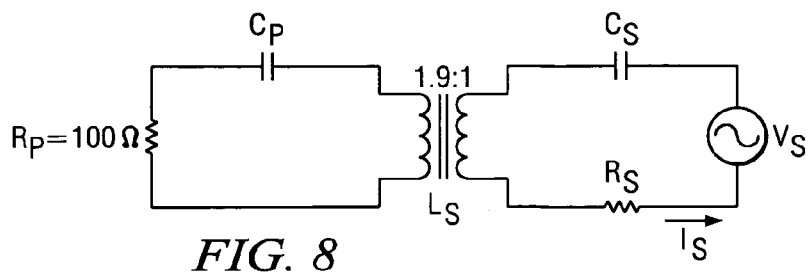
FIG. 8 is an electrical diagram, in schematic form, of an equivalent circuit in a calibration mode of the front end circuitry of FIG. 6 in performing SELT load impedance measurements according to the first preferred embodiment of the invention.

In process 100 of FIG. 7, the calibration constant $k_c$ is first derived. It is contemplated that calibration constant $k_c$ is preferably derived in an off-line manner, and indeed may be determined prior to deployment of line driver and receiver circuitry 58 itself. The calibration constant $k_c$ provides a gain factor that can be used to prevent overload due to the significantly lower source impedance with the active termination disabled; in effect, calibration constant $k_c$ permits the power on the loop to be constant between the calibration and normal operating modes. According to this embodiment of the invention, process 100 is performed by substituting a known impedance as the load; for example, a 100 Ω resistor may be connected across terminals LOOP of line driver and receiver circuitry 58. This gives rise to a relatively simple equivalent circuit, as shown in FIG. 8. From fundamental Laplace analysis, one can then readily derive the transfer function of source voltage $v_s$ to source current $i_s$ by:

$$H(s) = \frac{I_s(s)}{V_s(s)} \quad (11)$$

-continued
$$= \frac{L_p C_p C_s s^3 + R_p C_p C_s s^2 + C_s s}{C_p C_s L_p \left(R_s + \frac{R_p}{N^2}\right) s^3 + \left(\frac{L_p C_s}{N^2} + R_p R_s C_p C_s + L_p C_p\right) s^2 + (R_p C_p + R_s C_s) s + 1}$$

For an example of the simplified arrangement of FIG. 8, values of $R_p$=100 Ω, $C_p$=33 nF, the transform inductance $L_p$=400 µH, and a transformer ratio of 1.9:1, can be used. The calibration constant $k_c$ is desirably a ratio of the transfer function in a calibration mode (active termination disabled) versus the normal operating mode (active termination enabled). Considering that power is to remain constant, calibration constant $k_c$ is preferably the ratio of the square root of the transfer function H(s) for the two modes. The difference between active termination enabled and disabled can be considered as differences in the source impedance $R_s$. If, for example, the active termination provides a source impedance $R_s$ of 27.7 Ω when enabled, but a source impedance of 3.76 Ω when disabled, the calibration constant can be expressed as:

$$k_c = \sqrt{\frac{H^0(\omega)}{H(\omega)}} = \sqrt{\frac{2 \times \frac{100}{1.9^2}}{3.76 + \frac{100}{1.9^2}}} = 1.327 \quad (12)$$

where $H^0(\omega)$ is the transfer function in the calibration mode, with the active termination disabled. Accordingly, in this example, line driver and receiver circuitry 58 should reduce its power output by a factor of 1.327 when the active termination is disabled, to account for the heightened frequency response in that mode.

As mentioned above, the shape of the power spectrum is also altered by the disabling of the active termination. According to the preferred embodiments of the invention, therefore, the amplitude of the SELT transmission power is also preferably pre-compensated over the DSL tones used, according to the altered spectral shape, in process 102. The tone-by-tone compensation can be derived by evaluation of the frequency response from equation (11) above. Preferably, a look-up table is generated, by way of which DSP 54 controls the transmission power in the calibration mode. This table preferably includes values an amplitude factor $E_t(\omega_j)$ for the signal when the active termination is enabled, and an amplitude factor $E^0_t(\omega_j)$ for the signal when the active termination is disabled. For the example of FIG. 8, with the values above, the table of these pre-compensation values for DSL tones 7 through 63 is:

| Tone | $E^0_t(\omega_j)$ | $E_t(\omega_j)$ | Tone | $E^0_t(\omega_j)$ | $E_t(\omega_j)$ | Tone | $E^0_t(\omega_j)$ | $E_t(\omega_j)$ |
|---|---|---|---|---|---|---|---|---|
| 7 | 0.7969 | 0.8498 | 26 | 1.1069 | 1.0556 | 45 | 1.0401 | 1.0197 |
| 8 | 0.8137 | 0.8945 | 27 | 1.1004 | 1.0519 | 46 | 1.0385 | 1.0189 |
| 9 | 0.9496 | 0.9717 | 28 | 1.0944 | 1.0486 | 47 | 1.0370 | 1.0181 |
| 10 | 1.0736 | 1.0424 | 29 | 1.0889 | 1.0455 | 48 | 1.0355 | 1.0174 |
| 11 | 1.1553 | 1.0908 | 30 | 1.0838 | 1.0428 | 49 | 1.0342 | 1.0167 |
| 12 | 1.1995 | 1.1170 | 31 | 1.0792 | 1.0402 | 50 | 1.0329 | 1.0160 |
| 13 | 1.2181 | 1.1273 | 32 | 1.0749 | 1.0379 | 51 | 1.0317 | 1.0154 |
| 14 | 1.2214 | 1.1281 | 33 | 1.0709 | 1.0358 | 52 | 1.0305 | 1.0149 |
| 15 | 1.2161 | 1.1237 | 34 | 1.0672 | 1.0338 | 53 | 1.0294 | 1.0143 |

-continued

| Tone | $E^0_t(\omega_j)$ | $E_t(\omega_j)$ | Tone | $E^0_t(\omega_j)$ | $E_t(\omega_j)$ | Tone | $E^0_t(\omega_j)$ | $E_t(\omega_j)$ |
|---|---|---|---|---|---|---|---|---|
| 16 | 1.2066 | 1.1169 | 35 | 1.0638 | 1.0320 | 54 | 1.0284 | 1.0138 |
| 17 | 1.1951 | 1.1092 | 36 | 1.0606 | 1.0303 | 55 | 1.0274 | 1.0133 |
| 18 | 1.1831 | 1.1014 | 37 | 1.0577 | 1.0288 | 56 | 1.0265 | 1.0128 |
| 19 | 1.1712 | 1.0938 | 38 | 1.0549 | 1.0273 | 57 | 1.0256 | 1.0128 |
| 20 | 1.1598 | 1.0868 | 39 | 1.0524 | 1.0260 | 58 | 1.0247 | 1.0120 |
| 21 | 1.1492 | 1.0803 | 40 | 1.0500 | 1.0248 | 59 | 1.0239 | 1.0116 |
| 22 | 1.1393 | 1.0743 | 41 | 1.0477 | 1.0236 | 60 | 1.0232 | 1.0112 |
| 23 | 1.1301 | 1.0689 | 42 | 1.0456 | 1.0225 | 61 | 1.0224 | 1.0109 |
| 24 | 1.1217 | 1.0640 | 43 | 1.0437 | 1.0215 | 62 | 1.0218 | 1.0105 |
| 25 | 1.1140 | 1.0596 | 44 | 1.0418 | 1.0206 | 63 | 1.0211 | 1.0102 |

As mentioned above, process 102 can also be performed off-line, and in advance of the SELT measurements, if desired. Of course, if frequencies other than these DSL tones are used, the pre-compensation values for those frequencies will be adjusted to correspond to the particular frequencies used, and according to the characteristic of the altered spectral shape.

Figure 9A:
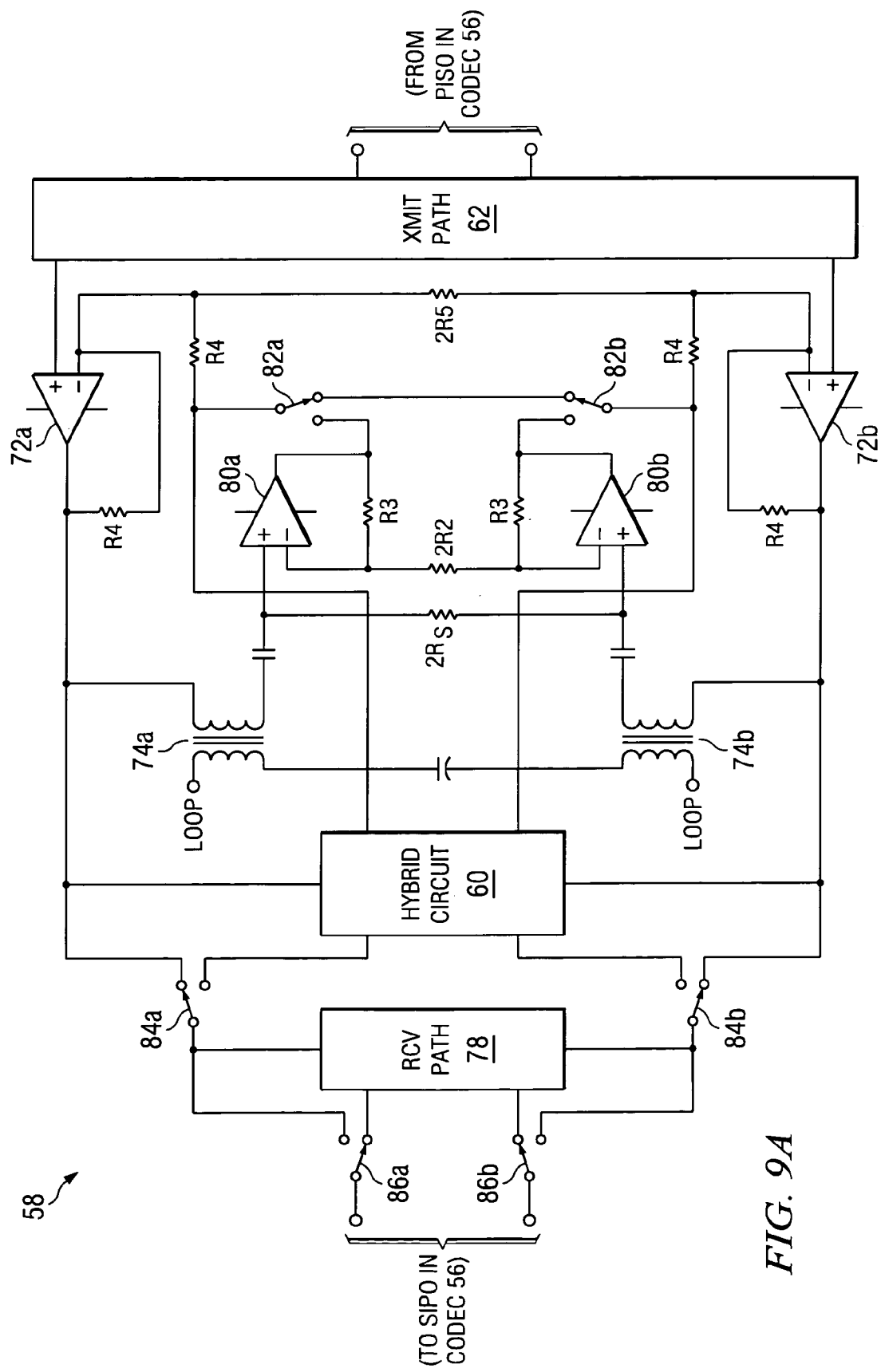
FIGS. 9a through 9d are electrical diagrams, in block and schematic form, of the front end circuitry of FIG. 6 in various operating modes, according to the first preferred embodiment of the invention.
Figure 9B:
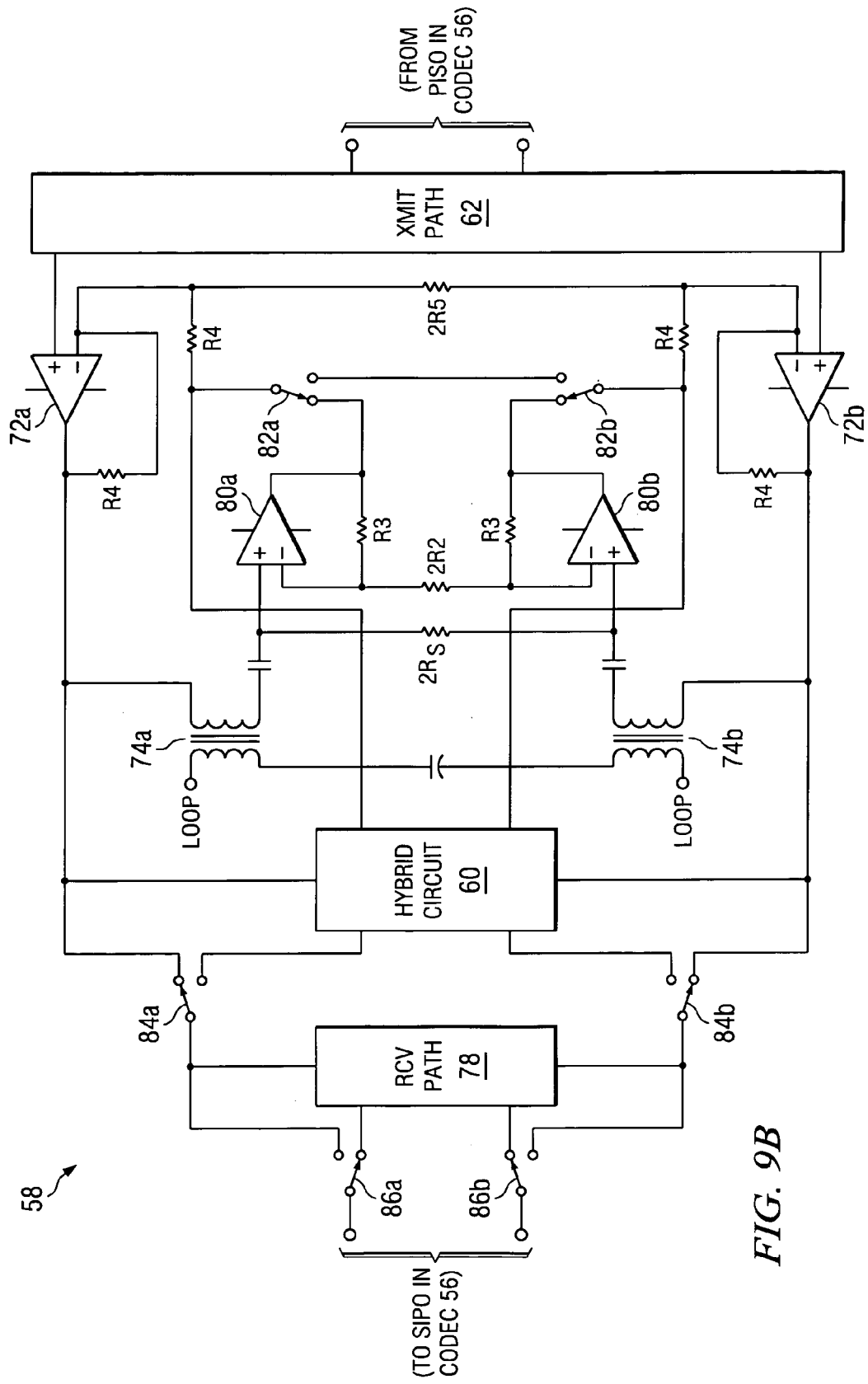
Figure 9C:
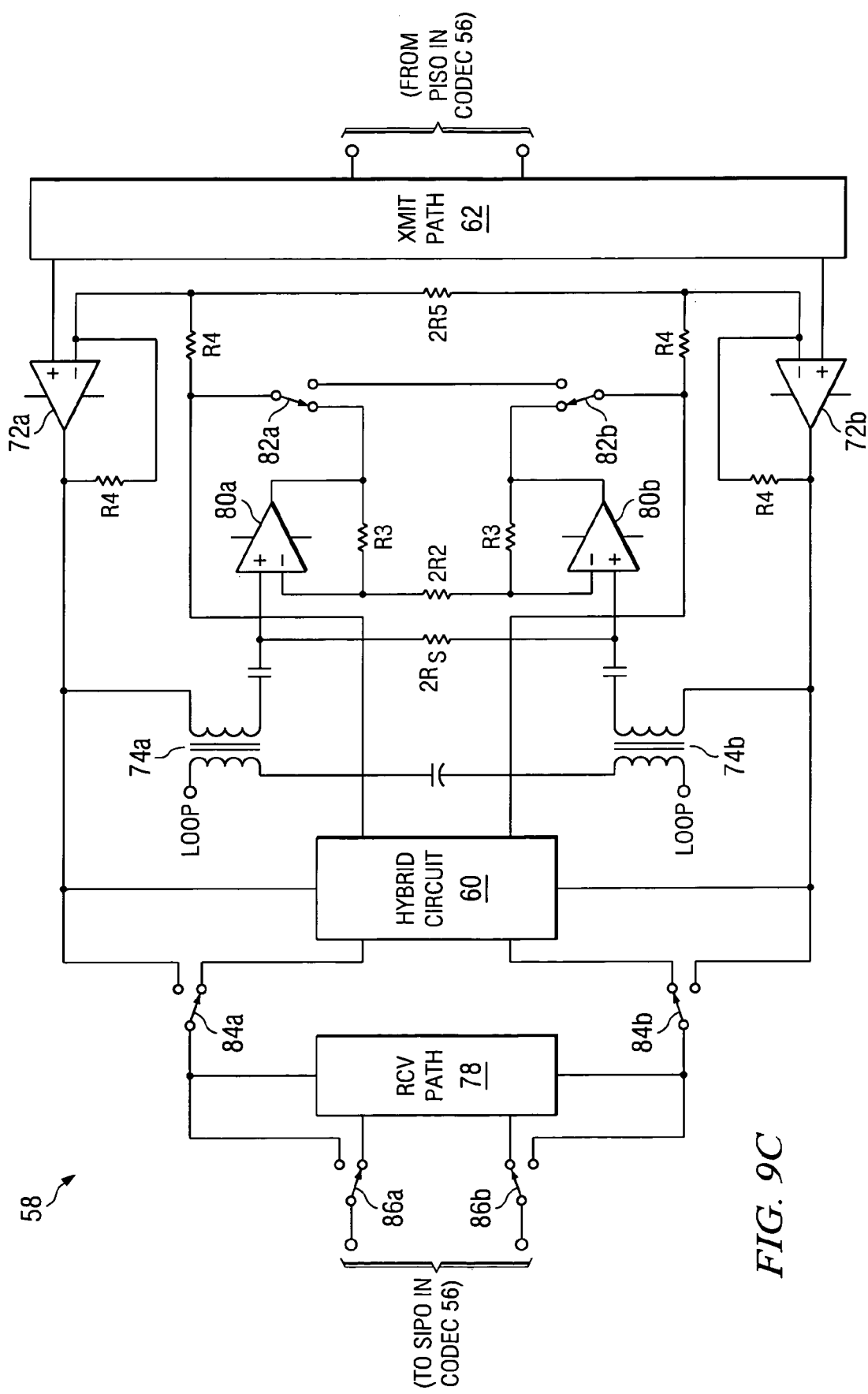

Referring back to FIG. 7 in combination with FIG. 6, the actual SELT measurement of the load impedance and the loop parameters can then be carried out. According to the preferred embodiment of the invention, hybrid circuit 60 is bypassed, in process 104, by controlling switches 84a, 84b accordingly. The active termination is also disabled at this time, in process 106, by controlling switches 82a, 82b accordingly. Switches 86 can be maintained to include receive path circuitry 78 in the circuit, so that the receive path analog filtering can be applied. The arrangement of line driver and receiver circuitry 58 in this calibration mode, after processes 104 and 106, is illustrated in FIG. 7a. To effect this state, DSP 54 has issued control signals to switches 84a, 84b, to connect the inputs of receive path circuitry 78 to the secondary windings of transformers 74a, 74b. Switches 86a, 86b are controlled by DSP 54 so that the outputs of receive path circuitry 78 are forwarded to codec 56, as in normal operation. In addition, active termination is disabled by DSP 54 controlling switches 82a, 82b to connect the outputs of amplifiers 80a, 80b together, rather than to the feedback inputs of amplifiers 72a, 72b, respectively, also as shown in FIG. 9a. By way of comparison, FIG. 9c illustrates the positions of switches 82, 84, 86 in normal operating mode, in which active termination, hybrid circuit 60, and receive path filtering are all enabled.

Once line driver and receiver circuitry 58 is placed into the calibration state as shown in FIG. 9a, the transfer function product $H_t(\omega)H_r(\omega)$ is measured in process 108. In practice, line driver and receiver circuitry 58 applies a transmit voltage corresponding to an IFFT-generated periodic signal, with contributions in each of the DSL tones, via transmit path 62, amplifiers 72, and transformers 74. The transmitted DMT signal that is applied to loop LOOP includes gain compensation by the calibration constant $k_c$ and pre-curve compensation amplitudes as derived in processes 100, 102 described above. In response to this excitation, receive path circuitry 78 receives the voltage over time and frequency, and forwards this received voltage to codec 56 in the conventional manner. From these measured and known received and transmitted voltages, respectively, DSP 54 can derive a measurement of the ratio of the average received voltage $\bar{V}_r^0(\omega)$ and transmit voltage $V_t^0(\omega)$), the superscript "0" indicating measurements from the calibration mode. With knowledge of the resistances R4, R5, one can calculate the product of the transfer functions of the transmit and receive path circuitry as:

$$H_t(\omega)H_r(\omega) = \frac{\bar{V}_r^0(\omega)}{\left(2 + \frac{R4}{R5}\right)V_t^0(\omega)} \quad (13)$$

This calculation of this transfer function product in process 108 is performed in the digital domain, preferably by DSP 54 upon the forwarding of the spectrum of the average received voltage $\bar{V}_r^0(\omega)$ and transmit voltage $V_t^0(\omega)$ from line driver and receiver circuitry 58.

Knowledge of the transfer function product now permits the calculation of the loop termination impedance $Z_L$, from additional SELT measurements. In process 110, DSP 54 places line driver and receiver circuitry 58 into mode that enables the active termination function. FIG. 9b illustrates this state of line driver and receiver circuitry 58, in which DSP 54 has issued control signals to switches 82, 84, 86. Switches 82a, 82b are controlled to enable active termination by connecting the outputs of amplifiers 80a, 80b to inputs of their corresponding amplifiers 72a, 72b. Switches 84a, 84b remain in the bypass state with the outputs of hybrid circuit 60 not connected to receive path circuitry 78, and switches 86a, 86b remain in the state in which the outputs of receive path circuitry 78 are connected to the inputs to codec 56.

Based upon the relationship of equation (8), the load impedance $Z_L(\omega)$ can be derived from:

$$\bar{V}_r(\omega) = f_1((Z_L(\omega))H_t(\omega)H_r(\omega)H_{ht}(\omega)V_t(\omega) \quad (14)$$

With knowledge of the transfer function product $H_t(\omega)H_r(\omega)$ from process 108, and because transfer function $H_{ht}(\omega)$ is not applicable (i.e., equals unity for all frequencies) because switches 84a, 84b are bypassing hybrid circuit 60, the load impedance $Z_L(\omega)$ is derived in process 112, by applying a transmit voltage IFFT signal over the DSL tones again, with line driver and receiver circuitry 58 in the mode illustrated in FIG. 9b, and measuring the received voltage. The derivation of load impedance $Z_L(\omega)$ follows:

$$Z_L(\omega) = \frac{R_s\left(\left(2 + \frac{R_3}{R_2}\right)A(\omega) - 1\right)}{1 - A(\omega)} \quad (15)$$

where $A(\omega)$ is the calibrated received voltage ratio, including compensation for both the calibration constant $k_c$ and the spectral shaping compensation:

$$A(\omega_j) = \frac{\overline{V}_r(\omega_j)E^0(\omega_j)}{k_c \overline{V}_r^0(\omega_j)E(\omega_j)} \quad (16)$$

It is contemplated that those skilled in the art will be readily able to derive the load impedance $Z_L$ based on these measurements.

The value of the load impedance $Z_L(\omega)$ derived in process 112 is an important loop parameter, and is particularly useful in the understanding of the loop under test. According to the preferred embodiment of the invention, the remainder of the loop parameters are then derived, in process 114, using a conventional minimization technique. In summary, DSP 54 carries out process 114 by executing a minimization algorithm, by way of which the values of a set of loop physical parameters are iterated to minimize a cost function:

$$\min_{\forall (l_1, l_2, \ldots, l_i)} \int_0^\pi \left\| f_1(l_1, l_2, \ldots, l_i, \omega) - \frac{\overline{V}_r(\omega)}{H_t(\omega)H_r(\omega)H_{ht}(\omega)V_t(\omega)} \right\| d\omega \quad (17)$$

The cost function amounts to the integral, over frequency, of the absolute value of the difference between a function of the set of loop physical parameters $l_1$ through $l_t$ and the load impedance function $f_1((Z_L(\omega)))$, where the load impedance is expressed in terms of a ratio of the received average voltage $\overline{V}_r(\omega)$ and the product $H_t(\omega)H_r(\omega)H_{ht}(\omega)V_t(\omega)$. Preferably, this is carried out by way of a least squares minimization approach, in which equation (17) becomes:

$$\frac{\partial}{\partial (l_1, l_2, \ldots, l_i)} \quad (18)$$

$$\int_0^\pi \left( f_1(l_1, l_2, \ldots, l_i, \omega) - \frac{\overline{V}_r(\omega)}{H_t(\omega)H_r(\omega)H_{ht}(\omega)V_t(\omega)} \right)^2 d\omega = 0$$

The integral in this equation (18) becomes a sum upon considering that the frequencies of interest are the discrete DSL tones:

$$\frac{\partial}{\partial (l_1, l_2, \ldots, l_i)} \quad (19)$$

$$\sum_{j=7}^{63} \left( f_1(l_1, l_2, \ldots, l_i, \omega) - \frac{\overline{V}_t(\omega)}{H_t(\omega)H_r(\omega)H_{ht}(\omega)V_t(\omega)} \right)^2 d\omega = 0$$

As discussed above, the transfer function product $H_t(\Omega)H_r(\Omega)$ is known from process 108, and transfer function $H_{ht}(\omega)$ is not applicable because of the bypass of hybrid circuit 60. It is contemplated that conventional DSP routines may thus be carried out by DSP 54 in performing this minimization of loop parameters $l_1$, through $l_t$, in process 114, to arrive at accurate measurements of the corresponding physical attributes of loop LOOP. In addition, the excitation signal need not be limited to specific DSL tones 7 through 63, but may extend to tones and frequencies outside of those frequencies, to the extent of the capability of modem 50.

According to this embodiment of the invention, therefore, the effects of the hybrid circuit and of the active termination functions are easily eliminated from the SELT load impedance measurements used in estimating the various physical loop parameters. It is therefore contemplated that this invention widens the range of loop conditions over which SELT may be used to characterize potential DSL subscriber loops.

Frequency Domain Reflectometry (FDR)

As mentioned above in connection with the Background of the Invention, FDR techniques characterize the subscriber loop by analysis of the frequencies at which standing waves are present in the loop. The standing waves are present between the source location and the locations of the loop at which impedance mismatches exist, such as at the load. The round trip distance between the source and an impedance mismatch is a multiple of the wavelengths of the standing waves. These wavelengths can easily be synchronously detected as voltage peaks in the spectrum of the received voltage, in response to a sweep of input frequencies applied to the loop. In the DSL context, the loop length D can be calculated from measurement of the characteristic resonant frequencies at which standing waves are formed.

As in the case of the load impedance based measurements, line driver and receiver circuitry 58 according to the preferred embodiment of the invention permits accurate calibration of circuitry itself 58 out of the measurements. This improves the precision and range of the FDR measurements. In particular, the preferred embodiments of this invention improve the ability of FDR to detect shorter minimum loop lengths, and also to better resolve loop lengths that are manifest by the ratio of two closely-spaced peak frequencies. The method of FDR measurement according to this preferred embodiment of the invention will now be described in connection with FIG. 6, FIGS. 9a through 9c, and FIG. 10.

Referring back to FIG. 6, an output voltage $V_O$ corresponding to the differential voltage across the outputs of amplifiers 72a, 72b will produce a received voltage signal $V_r$, and a transformer voltage $V_L$ defined as twice the voltage across the secondary coils of transformers 74a, 74b. The input voltage to line driver and receiver circuitry 58 is expressed as $V_t$. According to this embodiment of the invention, the frequencies at which peaks of the ratio $V_L(\omega)/V_t(\omega)$ are present are determined, and it is these frequencies that correspond to the standing wave frequencies, and that therefore indicate such physical loop parameters such as loop length D.

In theory, the measurement of $V_L(\omega)$ is largely equivalent to the load impedance measurement described above, based on the simplified equivalent circuit of FIG. 8. However, the FDR measurement of the ratio $V_L(\omega)/V_t(\omega)$ does not depend upon the source impedance $R_s$. According to this embodiment of the invention, the ratio $V_L(\omega)/V_t(\omega)$ can be derived as:

$$\frac{V_L(\omega)}{V_t(\omega)} = \frac{B(\omega)\left(2 + \frac{R_4}{R_5}\right)}{B(\omega) + 2\left(2 + \frac{R_3}{R_2}\right)} \quad (19)$$

The load impedance scalar value $B(\omega)$ corresponds to the load impedance measurement described above:

$$Z_L(\omega) = \frac{R_s\left(\left(2 + \frac{R_3}{R_2}\right)A(\omega) - 1\right)}{1 - A(\omega)} = R_s B(\omega) \quad (20)$$

However, as will be described below, the determination of the amplitude peak frequencies involves a frequency sweep input signal, rather than a DMT broadband signal, so that the resonant frequencies can be identified.

Referring to FIG. 10, the FDR process of this embodiment of the invention begins with processes 100 and 102, by way of which the calibration constant $k_c$ and the pre-compensation spectral shaping processes described above are performed. Of course, if these processes 100 and 102 were previously performed, offline or otherwise, for a previous SELT measurement such as the load impedance measurements described above, the same calibration and pre-compensation constants can be used for the FDR measurements according to this embodiment of the invention.

In process 122, switches 84a, 84b are controlled by DSP 54 or otherwise to bypass hybrid circuit 60 in line driver and receiver circuitry 58, as described above. In process 124, switches 82a, 82b are controlled by DSP 54 or otherwise to disable the active termination function performed by amplifiers 80a, 80b. The resulting state of line driver and receiver circuitry 58 is thus its calibration mode, as shown in FIG. 9a.

In process 126, a frequency sweep signal is applied to loop LOOP in this calibration mode. This frequency sweep signal corresponds to the input signal $V_i(\omega)$, and the transformer voltage signal $V_L(\omega)$ is measured from the reflected received signal $V_r(\omega)$. If modem 50 is not well adapted for generating a digital sweep signal, but is instead adapted to generate IFFT-based periodic signals, such as DMT signals in the DSL context, an IFFT based signal corresponding to a frequency sweep is generated, from which the FDR measurements can be readily made. The generation of a pseudo-sweep signal according to this embodiment of the invention will now be described in detail.

Transmission propagation constant γ can be expressed as:

$$\gamma = \alpha + \beta j = \frac{R}{2}\sqrt{\frac{C}{L}} + j\omega\sqrt{LC} \quad (21)$$

or:

$$\alpha = \frac{R}{2}\sqrt{\frac{C}{L}} \quad (22a)$$

$$\beta = 2\pi f \sqrt{LC} \quad (22b)$$

where L, R, and C are loop characteristic inductance, resistance, and capacitance, respectively. Recalling, from equation (7), the expression of the transmission line voltage V(x) on loop LOOP as a function of distance x as:

$$V(x) = -2V_0^+ e^{-\beta D i} \sin[\beta(x+D)]i \quad (7)$$

one can replace β with the expression in equation (22b):

$$V(0,f) = 2V_0^+ [\cos(2\pi\sqrt{LC}Df) + j\sin(2\pi\sqrt{LC}Df)] \cos(2\pi\sqrt{LC}Df) \quad (23)$$

In this expression, V(0,f) is a sinusoid signal in the frequency domain, where $F = \sqrt{LC}D$ can be considered as a frequency variable. According to this embodiment of the invention, voltage V(0,f) is digitized by sampling it at a sampling frequency $f_s$=4.3125 kHz, which is the bandwidth of each individual subchannel in conventional DSL communications. According to the Nyquist theorem, this sampling frequency $f_s$ is contemplated to be less than ½ the maximum frequency $F_{max} = \sqrt{LC}D_{max}$ for typical maximum length (20,000 ft.) loops of conventional AWG 24 and 26 twisted pair wire (e.g., $F_{max}$=29.4 kHz). As such, voltage V(0,f) can be fully recovered from samples V(0, $f_k$) for k=0, 1, 2, . . . According to this embodiment of the invention, because sampling frequency $f_s$ equals the subchannel bandwidth of 4.3125 kHz, a periodic excitation signal can be generated from V(0, $f_k$) for k=7, 8, . . . , 63, corresponding to tones 7 through 63 of the DSL spectrum.

In process 126, therefore, line driver and receiver circuitry 58 applies the periodic excitation signal as generated from V(0, $f_k$) for k=7, 8, . . . , 63, for tones 7 through 63 of the DSL spectrum, where the frequency multiple is based on sampling period $f_s$=4.3125 kHz. At this stage in the process, line driver and receiver circuitry 58 is in the calibration mode (FIG. 7a), and as such the responsive sampled received voltage $\overline{V}_r^0(\omega)$ is derived as the time average received voltages $\overline{V}_r^0(0, f_k)$ for k=7, . . . , 63 in this calibration mode, sampled at the frequencies multiples corresponding to DSL tones 7 through 63.

In process 128, switches 82a, 82b are controlled to enable active termination in line driver and receiver circuitry 58, leaving the calibration mode, and entering an operational mode in which hybrid circuit 60 is disabled. Process 130 is then performed, by way of which the pseudo-sweep signal is again applied to loop LOOP as V(0, $f_k$) for k=7, 8, . . . , 63, for tones 7 through 63 of the DSL spectrum, and the received voltages $\overline{V}_r(0, f_k)$ for k=7, . . . , 63 are sampled and measured.

In process 132, DSP 54 or such other appropriate computational circuitry executes the appropriate arithmetic operations to determine the ratio:

$$\frac{V_L(\omega)}{V_i(\omega)} = \frac{B(\omega)\left(2 + \frac{R_4}{R_5}\right)}{B(\omega) + 2\left(2 + \frac{R_3}{R_2}\right)} \quad (19)$$

for each of the DSL tones 7 through 63, in this example. Also in this process, DSP 54 can determine which of the tones produces the highest value of this ratio, to determine the resonant frequencies of loop LOOP. Physical parameters such as the loop length D can then be readily derived from the knowledge of these frequencies, as known in the art.

According to this embodiment of the invention, line driver and receiver circuitry 58 includes active termination, which provides excellent impedance matching with minimal power loss, but also the ability to calibrate out the impedance of the active termination for purposes of SELT characterization. It is contemplated that this ability to properly calibrate out the line driver circuitry widens the useful range and eventual measurement precision of the SELT FDR measurements.

Time Domain Reflectometry (TDR)

As mentioned above in connection with the Background of the Invention, TDR measures the time delay between a transmitted stimulus and the corresponding signal that is reflected from the impedance mismatch at the terminating end of the DSL loop. This time delay of course corresponds to the loop length D. In effect, the measurement carried out by the AFE of modem 50 is a measurement of a noise signal $v_n$, which requires the use of hybrid circuit 60 according to this embodiment of the invention. However, to accomplish this measurement using hybrid circuit 60, the transmitted stimulus signal $v_t$ will also be detected, in the form of an echo. According to this preferred embodiment of the invention, the cancellation of the echo of transmitted signal $v_t$ is accomplished, permitting measurement of the time delay contained within the sensed noise signal $v_n$. In addition, the transfer function $H_t(\omega)H_r(\omega)$ of hybrid circuit 60 is also calibrated out, to permit accurate measurement of this time delay.

In theory, referring back to FIG. 6, the desired measurement is the voltage between the outputs of amplifiers 80a, 80b, rather than the voltage across resistor $2R_s$ at transformer secondaries 74a, 74b. These two voltages have a constant ratio relative to one another, but the measurement using amplifiers 80 permits calibration out of the various characteristics of hybrid circuit 60 and line driver and receiver circuit 58, as will be described.

Figure 9D:
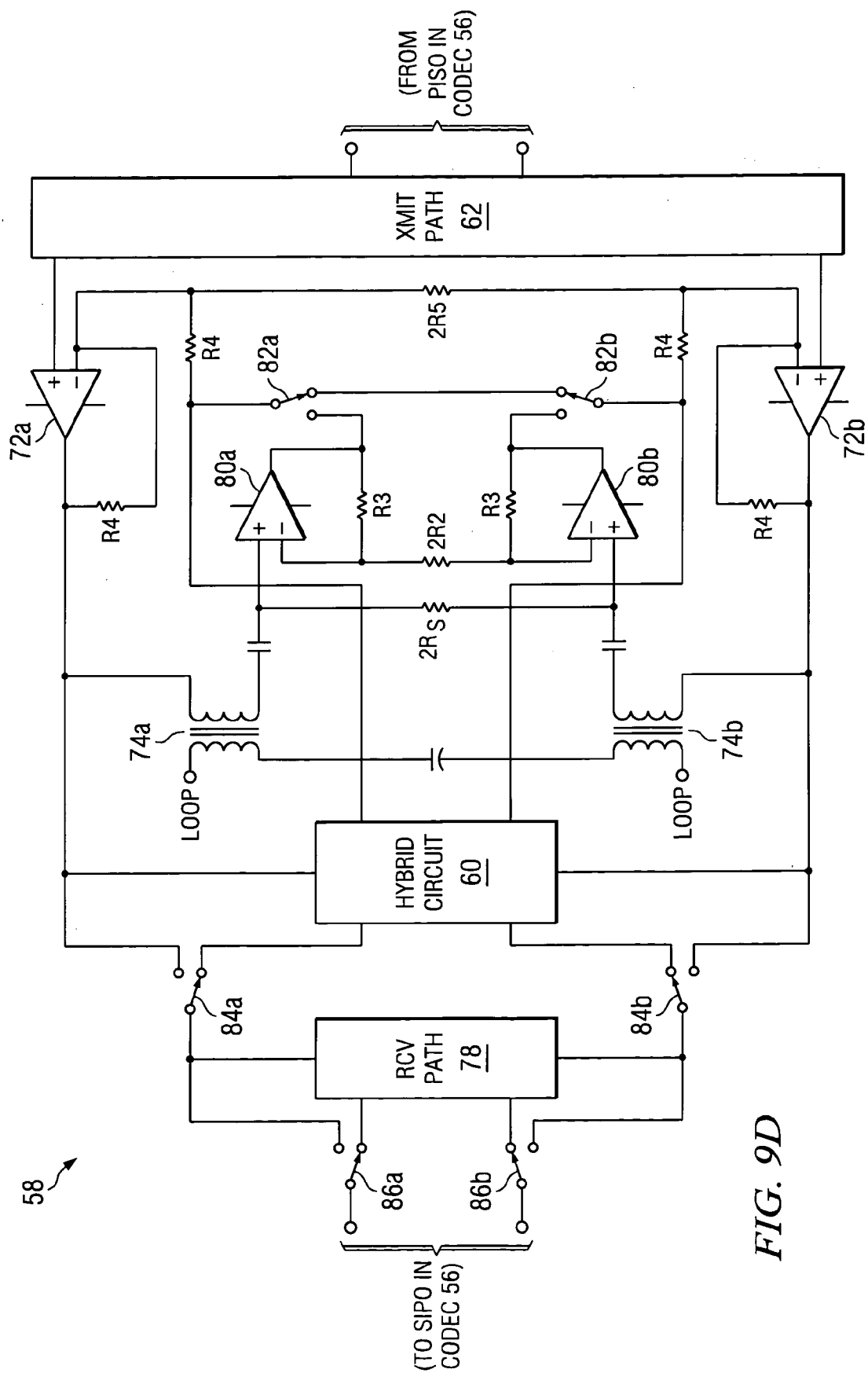

Consider the condition of line driver and receiver circuitry 58 as shown in FIG. 9d. In this state, hybrid circuit 60 is enabled but the active termination provided by amplifiers 80a, 80b is disabled. One can then express the time average received echo voltage as:

$$\overline{V}_r^0(\omega) = H_t(\omega)H_r(\omega)\left(\frac{2}{2+B(\omega)} - F(\omega)\right)\left(2 + \frac{R_4}{R_5}\right)V_t(\omega) \quad (24)$$

where $F(\omega)$ is the frequency response of the analog filter applied by hybrid circuit 60. In order to cancel this contribution of the transmitted voltage $V_t$ by providing this frequency response $F(\omega)$:

$$F(\omega) = \frac{2}{2+B(\omega)} \quad (25)$$

which forces the right side of equation (24) to zero. However, this cancellation cannot be guaranteed because of imprecision of the component values in hybrid circuit 60, and also because the loop impedance scalar $B(\omega)$ varies with loop length, especially for short loop lengths. This preferred embodiment of the invention, in carrying the TDR measurements, calibrates these characteristics out of the measurement, to provide an accurate TDR measurement over a wide range of loop lengths and circuit implementations.

Referring now to FIG. 11, the TDR method according to this embodiment of the invention will now be described in detail. As in the previous methods, processes 100 and 102 are performed, preferably offline, to determine the calibration constant $k_c$ and the pre-compensation spectral shaping values described above. The same calibration and pre-compensation constants can be used if processes 100 and 102 were previously performed for a previous SELT measurement such as the load impedance or FDR measurements. Alternatively, because the calibration constant $k_c$ and the pre-compensation values are frequency domain concepts, it is contemplated that similar effects can be implemented in the time domain by way of an analog time-domain filter.

In process 150, switches 84a, 84b are controlled by DSP 54 to bypass hybrid circuit 60. In process 152, the active termination of amplifiers 80a, 80b is disabled by switches 82a, 82b, also under the control of DSP 54 or otherwise. The resulting state of line driver and receiver circuitry 58 is thus its calibration mode, as shown in FIG. 7a. In this state, process 154 is performed to measure the transfer function product $H_r(\omega)H_t(\omega)$, as described above relative to process 108 (FIG. 7).

In process 156, active termination is enabled by controlling switches 82a, 82b accordingly. Process 158 is then performed, to measure load impedance scalar $B(\omega)$, in the manner described above relative to the load impedance and FDR measurements. Specifically, the measurement carried out in process 158 effects:

$$Z_L(\omega) = \frac{R_s\left(\left(2 + \frac{R_3}{R_2}\right)A(\omega) - 1\right)}{1 - A(\omega)} = R_s B(\omega) \quad (20)$$

Unlike the FDR measurements, however, the signal used in process 158 need not be a sweep-like signal. Rather, the values derived in the load impedance measurements may be used in process 158, if already available.

In process 160, DSP 54 or the other appropriate circuitry enables hybrid circuit 60 by controlling switches 84a, 84b accordingly. In process 162, active termination of amplifiers 80a, 80b is disabled by controlling switches 82a, 82b accordingly. The resulting state of line driver and receiver circuit 58 is as shown in FIG. 9d. Process 154 is then performed, by way of which the filter frequency response $F(\omega)$ of hybrid circuit 60 is measured, by the application of a known DMT signal and the measurement of the amplitudes at the corresponding tones via hybrid circuit 60.

Once filter frequency response $F(\omega)$ is known from process 164, active termination is then again enabled by switches 82a, 82b, placing line driver and receiver circuitry 58 into its normal operating mode, as shown in FIG. 9c. Numerical values corresponding to the measured transfer function product $H_r(\omega)H_t(\omega)$, load impedance scalar $B(\omega)$, and filter frequency response $F(\omega)$, are stored in the appropriate memory resource for DSP 54.

In process 168, the reflection signal $V_n(\omega)$ is then measured via line driver and receiver circuitry 58 in combination with hybrid circuit 60 and the remainder of modem 50. This measurement of process 168 is stimulated by the application of a transmitted voltage $V_t$ by line driver and receiver circuitry. According to this embodiment of the invention, the stimulus signal voltage $V_t$ may be a recognizable time domain pilot signal, or alternatively may be a chip-encoded spread spectrum signal, as known in the spread spectrum art, with the chip code unique over time so that decoding of the signal can be used to indicate the measured time delay. In any case, the measurement method of process 168 is preferably based on the expression:

$$\overline{V}_r^0(\omega) = H_t(\omega)H_r(\omega)\left\{\left(\frac{2}{2+B(\omega)} - F(\omega)\right)\frac{B(\omega)\left(2+\frac{R_4}{R_5}\right)}{B(\omega)+2\left(2+\frac{R_3}{R_2}\right)}V_t(\omega) + \left[\frac{2}{2+B(\omega)} - \left(\frac{2}{2+B(\omega)} - F(\omega)\right)\frac{B(\omega)\left(2+\frac{R_4}{R_5}\right)}{B(\omega)+2\left(2+\frac{R_3}{R_2}\right)}\right]V_n(\omega)\right\} \quad (26)$$

The first term of this equation permits cancellation of the first term of the sum, because of the measurements made in process 154 of frequency response F(ω), with line driver and receiver circuitry 58 in the state illustrated in FIG. 9c. This leaves the following measurement of the reflected signal $V_r$:

$$\overline{V}_r^0(\omega) = H_t(\omega) \left[ H_r(\omega) \left[ \frac{2}{2+B(\omega)} - \left( \frac{2}{2+B(\omega)} - F(\omega) \right) \frac{B(\omega)\left(2 + \frac{R_4}{R_5}\right)}{B(\omega) + 2\left(2 + \frac{R_3}{R_2}\right)} \right] V_n(\omega) \right] \quad (27)$$

in which knowledge of the measured transfer function product $H_r(\omega)H_t(\omega)$, load impedance scalar B(ω), and filter frequency response F(ω) permits retrieval of the reflected signal $V_n(\omega)$. This recovered signal can then be analyzed, either by time domain correlation or by correlation of the chip encoding, to derive the time delay of the reflection, and thus such physical parameters as the loop length.

According to this preferred embodiment of the invention, the ability to selectively enable and disable the hybrid circuit and the active termination, provides the ability to accurately calibrate out the frequency response and other characteristics of the line driver and receiver circuitry, thus greatly increasing the range of loop physical characteristics, such as loop length and the like, over which SELT TDR can be usefully applied. In addition, the echo cancellation used in process 168 can also be used for echo cancellation in normal operation, with the accuracy of the echo cancellation easily controlled by the selection of resistor ratios to a very close degree.

Transformer-Less Line Driver Circuitry

Figure 12:
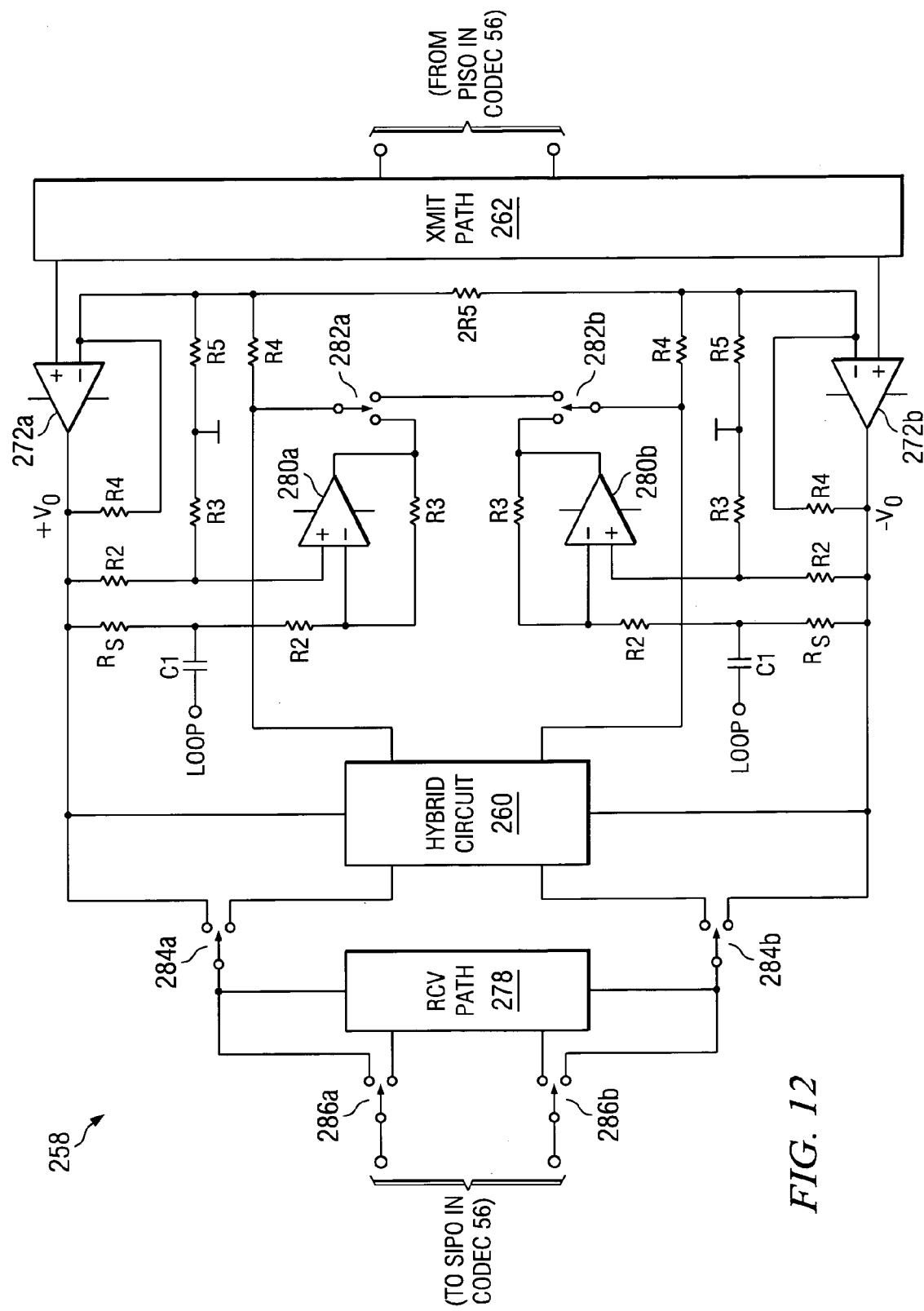
FIG. 12 is an electrical diagram, in schematic form, of front end circuitry according to a second preferred embodiment of the invention.

Referring now to FIG. 12, line driver and receiver circuitry 258 according to a second preferred embodiment of the invention will now be described. As apparent from FIG. 12, line driver and receiver circuitry 258 according to this embodiment of the invention is quite similar in construction to line driver and receiver circuitry 58 described above, but is constructed according to a transformer-less design. As such, the outputs of line driver and receiver circuitry 258 are capacitively coupled to loop LOOP, rather than coupled thereto through transformer 74 as before.

In FIG. 12, the construction of line driver and receiver circuitry 258 is illustrated, with corresponding elements referred to by the same reference numerals as in the transformer-based example of FIG. 6, but with an additional prefix (e.g., amplifier 80a of FIG. 6 corresponds to amplifier 280a of FIG. 12). As evident from FIG. 12, the output of drive amplifiers 272a, 272b are coupled to loop LOOP through capacitors C1, via a voltage divider of resistor $R_s$ and R2 between the output of amplifiers 272a, 272b and the inverting input of active termination amplifiers 280a, 280b, respectively.

According to this additional embodiment of the invention, the methods of carrying out load impedance measurements, and FDR and TDR measurements, using the transformer-less circuit of FIG. 12 are identical to that described above relative to the first preferred embodiment of the invention. The particular equations used to calculate the various parameters change for this embodiment of the invention, however. Accordingly, the following description will provide the differences in the equations only, it being understood that the general method and flow of these SELT measurements for this embodiment of the invention will be the same as described above.

Load Impedance Measurement

Figure 13:
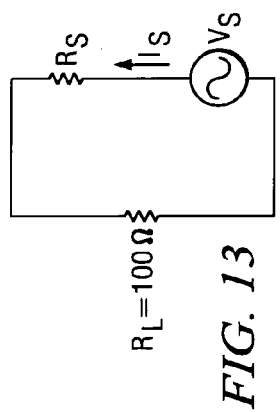
FIG. 13 is an electrical diagram, in schematic form, of an equivalent circuit in a calibration mode of the front end circuitry of FIG. 12 in performing SELT load impedance measurements according to the second preferred embodiment of the invention.

The process for load impedance measurement according to this second preferred embodiment of the invention is essentially identical to the method described above relative to FIG. 7 for line driver and receiver circuitry 58 according to the first preferred embodiment of the invention. For these load impedance measurements, however, the simplified circuit for the determination of the calibration constant $k_c$ is illustrated in FIG. 13, for the example of line driver and receiver circuitry 258 having resistor values of R3=9 kΩ, R2=1 kΩ, R4=10 kΩ, R5=45 kΩ, and $R_s$=5 Ω. This result in the equation for calibration constant $k_c$ becoming:

$$k_c = \sqrt{\frac{H^0(\omega)}{H(\omega)}} = \sqrt{\frac{2R_s\left(1 + \frac{R_3}{R_2}\right) + R_L}{2R_s + R_L}} = \sqrt{\frac{2 \times 5 \times \left(1 + \frac{9}{1}\right) + 100}{2 \times 5 + 100}} = 1.348 \quad (28)$$

In addition, the equation for the calculation of load impedance $Z_L$ changes, for the transformer-less case of FIG. 12, to:

$$Z_L(\omega) = R_s B(\omega) = \frac{2R_s\left(\left(1 + \frac{R_2}{R_3}\right)A(\omega) - 1\right)}{1 - A(\omega)} \quad (29)$$

so long as $R_s \ll R_2$, as is the case in this example.

Frequency Domain Reflectometry

The process for frequency domain reflectometry (FDR) according to this second preferred embodiment of the invention is also essentially identical to the FDR method described above relative to FIG. 10. The only substantial difference for this transformer-less implementation is that the equation of the ratio of the reflected to input voltages becomes:

$$\frac{V_L(\omega)}{V_i(\omega)} = \frac{B(\omega)\left(2 + \frac{R_4}{R_5}\right)}{B(\omega) + 2\left(1 + \frac{R_3}{R_2}\right)} \quad (30)$$

The process is otherwise identical.

Time Domain Reflectometry

Similarly, the method of performing time domain reflectometry (TDR) for the transformer-less line driver and receiver circuitry 258 according to this embodiment of the invention involves the same method as described above relative to FIG. 11. The relationship of the time-averaged measured received voltage changes to:

$$\overline{V}_r^0(\omega) = H_t(\omega)H_r(\omega)\left\{ \left( \frac{2}{2+B(\omega)} - F(\omega) \right) \frac{B(\omega)\left(2 + \frac{R_4}{R_5}\right)}{B(\omega) + 2\left(1 + \frac{R_3}{R_2}\right)} V_t(\omega) + \right. \quad (31)$$

-continued $$\left[\frac{2}{2+B(\omega)} - \left(\frac{2}{2+B(\omega)} - F(\omega)\right) \frac{B(\omega)\left(2 + \frac{R_4}{R_5}\right)}{B(\omega) + 2\left(1 + \frac{R_3}{R_2}\right)}\right] V_n(\omega) \right\}$$

The method otherwise remains the same.

Noise Measurement

According to either of the first and second preferred embodiments of this invention, switches 86a and 86b, or 286a, 286b, as may be the case, may be used in the measurement of the noise spectrum present on loop LOOP. As discussed above, switches 86, 286 serve to bypass receive path circuit 78, 278, respectively, and thus the analog receive path filtering contained in that circuit. According to the preferred embodiments of the invention, both upstream and downstream noise can be measured. For measurement of upstream noise (i.e., from the customer premises to modem 50), switches 86, 286 are controlled to include receive path circuit 78, 278 in the loop, during which the noise on loop LOOP can be measured. For measurement of downstream noise from modem 50 to loop LOOP, switches 86, 286 are controlled to bypass receive path circuitry 78, 278, respectively. A high sampling rate (e.g., 2.208 MHz) in codec 56 is then preferably used to analyze the complete downstream noise spectrum. An estimate of the artificial effects of aliasing can be made a priori, and subtracted from the sampled measurement.

Further in the alternative, switches 86a and 86b, or 286a, 286b, as the case may be, can be used to selectively bypass the receive path filtering (typically low-pass filters) of receive path circuitry 78, 278 during the load impedance measurements, and during the FDR and TDR measurements. This bypass will permit perform those measurements to be made over a wider range of frequencies.

DSP Modifications

As mentioned above, it is contemplated that DSP 54, or other digital logic provided within modem 50, has the necessary computational capacity to timely perform the SELT measurements described in connection with the preferred embodiments of the invention. It is also contemplated that those skilled in the art having reference to this specification will be readily able to implement those digital calculations and control operations into DSP 54, preferably by way of executable program instruction sequences, as known in the art.

However, it has further been observed, in connection with this invention, that conventional programmable DSP devices may often not be capable of keeping up with the necessary measurements and calculations, to the extent that SELT processes cannot be executed in real-time. According to the preferred embodiments of the invention, therefore, DSP 54 is modified from the architecture of conventional programmable DSPs to optimize the execution of these SELT measurements.

Figure 14:
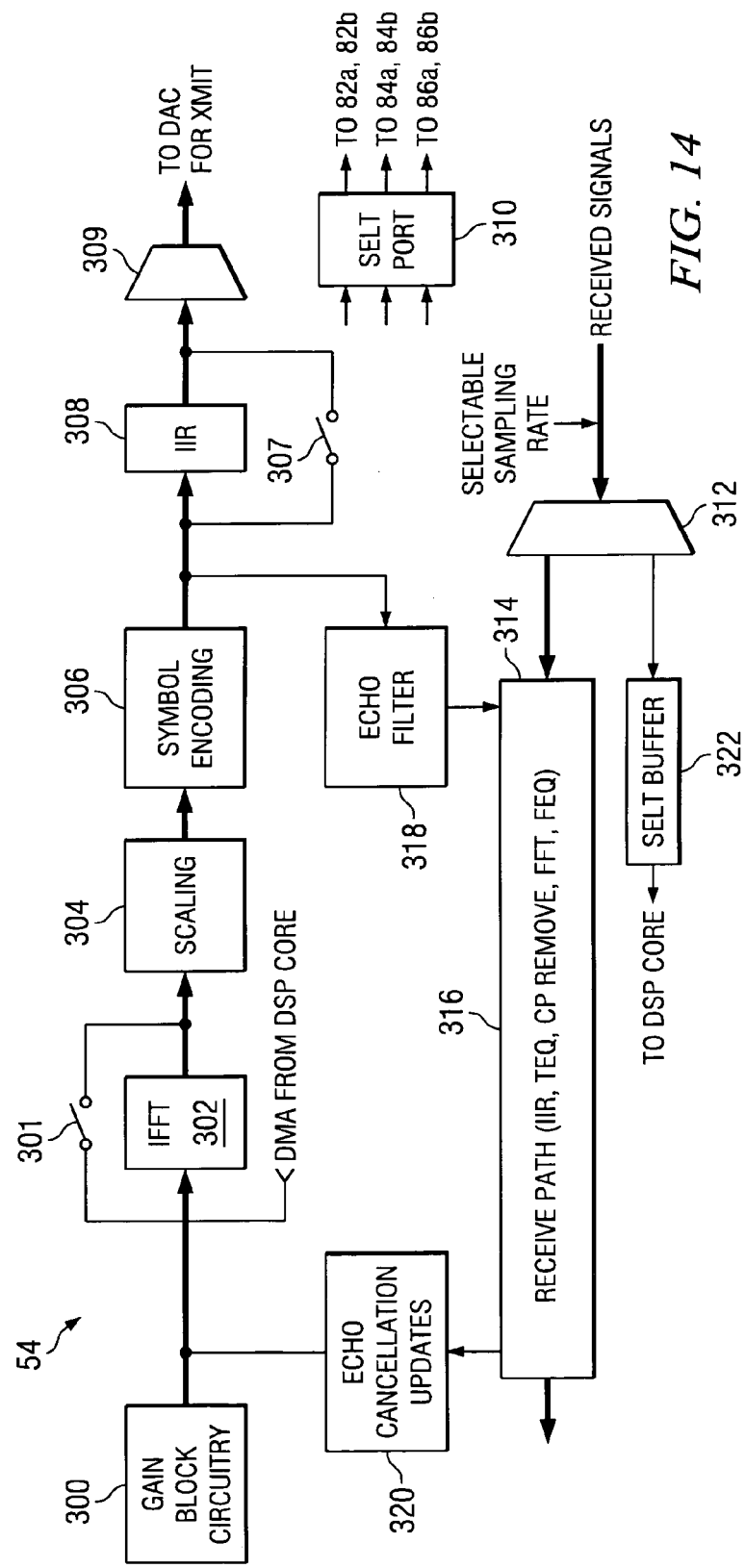
FIG. 14 is a functional diagram illustrating the functional architecture of a digital signal processor in the DSL modem transceiver according to the preferred embodiments of the invention.

FIG. 14 illustrates an exemplary data flow architecture for DSP 54, according to the preferred embodiments of the invention. As in typical DSP implementations of DSL modems, the data flow architecture includes, in the transmit path, gain block circuitry 300, which includes memory and logic functionality for shaping the gain spectrum of the signal to be transmitted. The symbols output by gain block circuitry 300 are applied to IFFT function 302, which performs an inverse FFT to convert the symbol values into amplitude coefficients for each of the desired DSL subchannels, in the conventional manner. Scaling function 304 and symbol encoding function 306 further format the frequency domain symbols in the conventional manner, including such functions as adding sign bits, prepending a cyclic prefix, and the like. IIR digital filter 308 applies the desired filtering to the encoded signal, following which it is combined into a bitstream that selectively applied to the digital-to-analog function in codec 56 of modem 50, for transmission. On the receive path, the received signal is sampled at a selected sampling rate, and is applied by demultiplexer to conventional receive path functions 316. Receive path functions include such functions as an IIR receive digital filter, time domain equalization to shorten the channel response, removal of the cyclic prefix, FFT to recover the symbols from the various DSL subchannels, and frequency domain equalization to recover the original signal.

Also according to this conventional architecture, echo cancellation is performed by way of echo filter 318, which receives the transmitted signal prior to IIR filtering, and applies this transmitted signal to the receive path. Updates regarding such compensation as may be useful for echo cancellation are forwarded by receive path functions 316 to the transmit side via update block 320.

The functions illustrated in FIG. 14 may be performed by the core of DSP 54, or alternatively by custom logic circuitry of DSP 54. In either case, core DSP functionality remains available in DSP 54, for performing much of the numerical calculations that may be required in the SELT methods according to the preferred embodiments of the invention.

Certain additional functionality is also provided in DSP 54, to assist in the performing of the SELT measurements in the necessary time slots. One such additional function is the provision of a direct memory access (DMA) path from the DSP core to the input of the IFFT function 302. This permits the direct application of coefficients involved in generating the various excitation signals used in the SELT measurements described above. In combination with this path, bypass switch 301 around IFFT function 302 is provided, so that the DSP core can generate time domain signals for transmission over the subscriber loop, for example as useful in FDR SELT processes as described above. For these signals, bypass switch 307 around IIR filter 308 is also provided, so that the time domain signals can pass unfiltered to the subscriber loop. Because IFFT function 302 and IIR function 308 are generally implemented in software, these bypass switches 301, 307 can be software switches if desired.

Also according to the preferred embodiments of the invention, SELT port 310 is provided in DSP 54. SELT port 310 amounts to control circuitry that receives input signals, for example from control registers or from an instruction decoder, from which control signals are forwarded to switches 82, 84, 86 of FIG. 6. In this manner, DSP 54 controls the various operating modes of line driver and receiver circuitry 58, for example as shown in FIGS. 9a through 9d.

On the receive side, SELT buffer 322 is connected to an output of receive demultiplexer 312. For those SELT methods, as described above, the forwarding of the measured results directly to the DSP core, without passing through receive path functions 316, is desirable. In addition, as indicated in FIG. 14, DSP 54 also includes a software selectable sampling rate on the receive side. As described above, functions such as noise measurement are preferably performed by sampling at an extremely high sample rate, for example 2.208 MHz.

It is contemplated that these modifications to the DSP architecture provide even more advantages and benefits in the SELT measurements according to the preferred embodiments of the invention.

According to the preferred embodiments of this invention, therefore, improved SELT measurement capability is provided to the central office modem. The ability to calibrate out the line driver characteristics provides improved precision of the measurements, and indeed broaden the range of potential subscriber loops that can be measured from the central office. Furthermore, this capability is provided in a manner that is compatible with active termination techniques, as is much desired for efficient signal transmission. It is also contemplated that this invention can be implemented very efficiently in modern communications circuit technology.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. Analog front end circuitry for a DSL modem, comprising:
   transmit path circuitry for processing a serial signal stream from a codec;
   output amplifiers having inputs coupled to the transmit path circuitry, and having outputs for driving a subscriber loop with signals corresponding to the processed serial signal stream;
   receive path circuitry, for processing signals received from the subscriber loop and forwarding the processed signals to the codec;
   a hybrid circuit, for isolating the receive path circuitry from signals transmitted by the output amplifiers to the subscriber loop;
   active termination circuitry, coupled to the outputs of the output amplifiers, for synthesizing an output impedance corresponding to the subscriber loop impedance;
   first bypass switch circuitry, coupled to the hybrid circuit, for selectively bypassing the hybrid circuit; and
   second bypass switch circuitry, coupled to the active termination circuitry, for selectively disabling the active termination circuitry.

2. The circuitry of claim 1, further comprising:
   programmable circuitry for controlling the first and second bypass switch circuitry according to a desired operating mode of the analog front end circuitry.

3. The circuitry of claim 2, wherein the programmable circuitry comprises a digital signal processor.

4. The circuitry of claim 3, wherein the digital signal processor is programmed to perform a sequence of operations corresponding to single-ended loop testing of the subscriber loop, the sequence of operations comprising:
   controlling the first bypass switch circuitry to bypass the hybrid circuit;
   controlling the second bypass switch circuitry to disable the active termination circuitry;
   then applying an excitation signal to the subscriber loop via the transmit path circuitry and the output amplifiers, and receiving a received signal via the receive path circuitry from the subscriber loop, to measure a transfer function product of the transmit and receive path circuitry;
   then controlling the second bypass switch circuitry to enable the active termination circuitry;
   then applying an excitation signal to the subscriber loop via the transmit path circuitry and the output amplifiers, and receiving a received signal via the receive path circuitry, to measure an estimate of the impedance of the subscriber loop; and
   then performing a minimization routine to estimate physical loop parameters, using the estimate of the impedance of the subscriber loop.

5. The circuitry of claim 4, wherein the operation of applying an excitation signal to the subscriber loop comprises applying a modulated signal to each of a plurality of subchannels in a spectrum.

6. The circuitry of claim 5, wherein the sequence of operations further comprises:
   prior to the step of applying an excitation signal after the step of controlling the second bypass switch circuitry to disable the active termination circuitry, generating output amplitudes for each of the tones of the modulated signal according to a calibration constant $k_e$ and to a pre-compensation spectrum.

7. The circuitry of claim 3, wherein the digital signal processor is programmed to perform a sequence of operations corresponding to single-ended loop testing of the subscriber loop, the sequence of operations comprising:
   controlling the first bypass switch circuitry to bypass the hybrid circuit;
   controlling the second bypass switch circuitry to disable the active termination circuitry;
   then applying a frequency sweep excitation signal to the subscriber loop via the transmit path circuitry and the output amplifiers, and receiving a received signal via the receive path circuitry from the subscriber loop, to measure a calibration mode received voltage spectrum;
   then controlling the second bypass switch circuitry to enable the active termination circuitry;
   then applying a frequency sweep excitation signal to the subscriber loop via the transmit path circuitry and the output amplifiers, and receiving a received signal via the receive path circuitry from the subscriber loop, to measure an operating mode received voltage spectrum;
   then analyzing the measured calibration and operating mode received voltage spectra to determine frequencies of maximum received voltage relative to transmitted voltage.

8. The circuitry of claim 7, wherein the operation of applying a frequency sweep excitation signal comprises:
   generating a pseudo-sweep excitation signal in the form of a periodic excitation signal at each of a plurality of tones of a modulated signal corresponding to each of a plurality of subchannels in the DSL spectrum.

9. The circuitry of claim 7, wherein the sequence of operations further comprises:
   prior to the step of applying a frequency sweep excitation signal after the step of controlling the second bypass switch circuitry to disable the active termination circuitry, generating output amplitudes for each of the tones of the modulated signal according to a calibration constant $k_e$ and to a pre-compensation spectrum.

10. The circuitry of claim 3, wherein the digital signal processor is programmed to perform a sequence of operations corresponding to single-ended loop testing of the subscriber loop, the sequence of operations comprising:
    controlling the first bypass switch circuitry to bypass the hybrid circuit;

controlling the second bypass switch circuitry to disable the active termination circuitry;

then applying an excitation signal to the subscriber loop via the transmit path circuitry and the output amplifiers, and receiving a received signal via the receive path circuitry from the subscriber loop, to measure a transfer function product of the transmit and receive path circuitry;

then controlling the second bypass switch circuitry to enable the active termination circuitry;

then applying an excitation signal to the subscriber loop via the transmit path circuitry and the output amplifiers, and receiving a received signal via the receive path circuitry from the subscriber loop, to measure a load impedance scalar of the transmit and receive path circuitry;

then controlling the first bypass switch circuitry to enable the hybrid circuit;

controlling the second bypass switch circuitry to disable the active termination circuitry;

then applying an excitation signal to the subscriber loop via the transmit path circuitry and the output amplifiers, and receiving a received signal via the receive path circuitry from the subscriber loop, to measure a hybrid block filter frequency response;

then controlling the second bypass switch circuitry to enable the active termination circuitry; and then applying a time domain reflectometry excitation signal to the subscriber loop via the transmit path circuitry and the output amplifiers, and receiving a received signal via the receive path circuitry from the subscriber loop, to measure a reflection signal and identify reflection times from the subscriber loop.

11. The circuitry of claim 10, wherein the time domain reflectometry excitation signal is a recognizable time domain pilot signal; and wherein the reflection signal is measured by convolution of the pilot signal with the received signal.

12. The circuitry of claim 10, wherein the time domain reflectometry excitation signal is a chip-encoded spread spectrum signal; and wherein the reflection signal is measured by decoding the received signal with the chip code corresponding to the chip-encoded spread spectrum signal.

13. The circuitry of claim 10, wherein the sequence of operations further comprises:
prior to the step of applying an excitation signal after the step of controlling the second bypass switch circuitry to disable the active termination circuitry, generating output amplitudes for each of the tones of a modulated signal according to a calibration constant $k_c$ and to a pre-compensation spectrum.

14. The circuitry of claim 1, further comprising:
a transformer, for coupling the output of the output amplifiers to the subscriber loop.

15. The circuitry of claim 14, wherein the output amplifiers comprise a first amplifier having an output coupled to a first secondary of the transformer, and a second amplifier having an output coupled to a second secondary of the transformer;
and wherein the subscriber loop is coupled to first and second primaries of the transformer.

16. The circuitry of claim 15, wherein the active termination circuitry comprises:
a first operational amplifier having a first input coupled to the first secondary of the transformer, having a second input, and having an output coupled to a first bypass switch of the second bypass switch circuitry;

a second operational amplifier having a first input coupled to the second secondary of the transformer, having a second input coupled to the second input of the first operational amplifier, and having an output coupled to a second bypass switch of the second bypass switch circuitry;

wherein the first and second bypass switches selectably couple the outputs of the first and second operational amplifiers to feedback inputs of the first and second output amplifiers, respectively.

17. The circuitry of claim 1, wherein the output amplifiers comprise a first amplifier and a second amplifier; and further comprising:
a first coupling capacitor coupled between the output of the first amplifier and the subscriber loop; and
a second coupling capacitor coupled between the output of the second amplifier and the subscriber loop.

18. The circuitry of claim 17, wherein the active termination circuitry comprises:
a first operational amplifier having first and second complementary inputs resistively coupled to the output of the first amplifier, and having an output coupled to a first bypass switch of the second bypass switch circuitry;

a second operational amplifier having first and second complementary inputs resistively coupled to the output of the second amplifier, having a second input coupled to the second input of the first operational amplifier, and having an output coupled to a second bypass switch of the second bypass switch circuitry;

wherein the first and second bypass switches selectably couple the outputs of the first and second operational amplifiers to feedback inputs of the first and second output amplifiers, respectively.

19. The circuitry of claim 1, further comprising:
third bypass switch circuitry, for selectably bypassing the receive path circuitry.

20. A method of performing single ended loop testing of a DSL subscriber loop using analog front end circuitry comprised of line driver and receiver circuitry including active termination circuitry, transmit and receive path circuitry, and a hybrid circuit, the method comprising the steps of:
controlling first bypass switch circuitry to bypass the hybrid circuit;
controlling second bypass switch circuitry to disable the active termination circuitry;
then measuring a product of the transfer functions of the transmit and receive path circuitry in response to applying an excitation signal to the subscriber loop via the transmit path circuitry and the output amplifiers, and receiving a received signal via the receive path circuitry from the subscriber loop;
then controlling the second bypass switch circuitry to enable the active termination circuitry;
then measuring an estimate of the impedance of the subscriber loop in response to applying an excitation signal to the subscriber loop via the transmit path circuitry and the output amplifiers, and receiving a received signal via the receive path circuitry; and
then minimizing a cost function to estimate physical loop parameters, using the estimate of the impedance of the subscriber loop.

21. The method of claim 20, wherein the step of applying an excitation signal to the subscriber loop comprises applying a modulated signal to each of a plurality of subchannels in a spectrum.

22. The method of claim 21, further comprising:
prior to the step of measuring a product of the transfer functions of the transmit and receive path circuitry, generating output amplitudes for each of the tones of the modulated signal according to a calibration constant $k_c$ and to a pre-compensation spectrum.

23. The method of claim 20, further comprising:
controlling the first bypass switch circuitry to bypass the hybrid circuit;
controlling the second bypass switch circuitry to disable the active termination circuitry;
then applying a frequency sweep excitation signal to the subscriber loop;
receiving a received signal via the receive path circuitry from the subscriber loop responsive to the frequency sweep excitation signal;
measuring a calibration mode received voltage spectrum from the received signal;
then controlling the second bypass switch circuitry to enable the active termination circuitry;
then applying a frequency sweep excitation signal to the subscriber loop;
receiving a received signal via the receive path circuitry from the subscriber loop responsive to the frequency sweep excitation signal;
measuring an operating mode received voltage spectrum from the received signal;
then analyzing the measured calibration and operating mode received voltage spectra to determine frequencies of maximum received voltage relative to transmitted voltage.

24. The method of claim 23, wherein the step of applying an excitation signal to the subscriber loop comprises applying a pseudo-sweep signal in the form of a modulated signal at each of a plurality of subchannels in a spectrum.

25. The method of claim 24, further comprising:
prior to the step of measuring a product of the transfer functions of the transmit and receive path circuitry, generating output amplitudes for each of the tones of the modulated signal according to a calibration constant $k_c$ and to a pre-compensation spectrum.

26. The method of claim 20, further comprising:
controlling the first bypass switch circuitry to bypass the hybrid circuit;
controlling the second bypass switch circuitry to disable the active termination circuitry;
then measuring a product of the transfer functions of the transmit and receive path circuitry in response to applying an excitation signal to the subscriber loop, and receiving a received signal via the receive path circuitry from the subscriber loop;
then controlling the second bypass switch circuitry to enable the active termination circuitry;
then measuring a load impedance scalar in response to applying an excitation signal to the subscriber loop, and receiving a received signal from the subscriber loop;
then controlling the first bypass switch circuitry to enable the hybrid circuit;
controlling the second bypass switch circuitry to disable the active termination circuitry;
then measuring a hybrid circuit filter frequency response in response to applying an excitation signal to the subscriber loop and receiving a received signal from the subscriber loop;
then controlling the second bypass switch circuitry to enable the active termination circuitry; and
then identifying reflection times from the subscriber loop in response to applying a time domain reflectometry excitation signal to the subscriber loop and receiving a received signal via the receive path circuitry from the subscriber loop.

27. The method of claim 26, wherein the step of applying an excitation signal to the subscriber loop comprises applying a modulated signal at each of a plurality of subchannels in a spectrum.

28. The method of claim 27, further comprising:
prior to the step of measuring a product of the transfer functions of the transmit and receive path circuitry, generating output amplitudes for each of the tones of the modulated signal according to a calibration constant $k_c$ and to a pre-compensation spectrum.

29. The method of claim 20, further comprising:
controlling third bypass switch circuitry to enable the receive path circuitry;
then measuring upstream noise on the subscriber loop;
then controlling the third bypass switch circuitry to bypass the receive path circuitry; and
then measuring downstream noise on the subscriber loop.

* * * * *